(12) United States Patent
Kurita et al.

(10) Patent No.: US 12,086,426 B2
(45) Date of Patent: Sep. 10, 2024

(54) MEMORY SYSTEM, INFORMATION PROCESSING SYSTEM, AND HOST DEVICE

(71) Applicant: Kioxia Corporation, Tokyo (JP)

(72) Inventors: Takahiro Kurita, Sagamihara Kanagawa (JP); Shinichi Kanno, Ota Tokyo (JP); Yuki Sasaki, Kamakura Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 134 days.

(21) Appl. No.: 17/412,028

(22) Filed: Aug. 25, 2021

(65) Prior Publication Data

US 2022/0300172 A1    Sep. 22, 2022

(30) Foreign Application Priority Data

Mar. 22, 2021 (JP) ................. 2021-047518

(51) Int. Cl.
*G06F 3/06* (2006.01)
(52) U.S. Cl.
CPC .......... *G06F 3/0625* (2013.01); *G06F 3/0652* (2013.01); *G06F 3/0659* (2013.01); *G06F 3/0679* (2013.01)
(58) Field of Classification Search
CPC .... G06F 3/0652; G06F 3/0659; G06F 3/0679; G06F 3/0625
USPC ....................................................... 711/103
See application file for complete search history.

(56) References Cited

U.S. PATENT DOCUMENTS

| | | | |
|---|---|---|---|
| 8,909,855 B2 | 12/2014 | Nemazie | |
| 2007/0030734 A1 | 2/2007 | Sinclair et al. | |
| 2010/0085806 A1* | 4/2010 | Wang | G11C 11/4074 365/182 |
| 2010/0287217 A1 | 11/2010 | Borchers et al. | |
| 2011/0016336 A1* | 1/2011 | Mori | G06F 3/067 711/E12.001 |
| 2012/0331207 A1* | 12/2012 | Lassa | G06F 1/3278 711/E12.008 |
| 2014/0047165 A1 | 2/2014 | Nemazie | |
| 2014/0250273 A1 | 9/2014 | Chen et al. | |
| 2015/0089123 A1 | 3/2015 | Nemazie | |
| 2015/0169443 A1* | 6/2015 | Lee | G06F 12/0246 711/103 |
| 2017/0177217 A1* | 6/2017 | Kanno | G06F 3/0625 |
| 2018/0211708 A1 | 7/2018 | Igahara et al. | |
| 2019/0179747 A1* | 6/2019 | Kim | G06F 12/0246 |
| 2019/0279315 A1* | 9/2019 | Takeuchi | H02J 3/14 |
| 2019/0310956 A1 | 10/2019 | Olarig et al. | |
| 2020/0133843 A1* | 4/2020 | Muchherla | G06F 12/0253 |

(Continued)

FOREIGN PATENT DOCUMENTS

| | | | |
|---|---|---|---|
| JP | 2009-503746 A | 1/2009 | |
| JP | 2012-523593 A | 10/2012 | |
| JP | 2012-523631 A | 10/2012 | |

(Continued)

*Primary Examiner* — Gautam Sain
(74) *Attorney, Agent, or Firm* — Foley & Lardner LLP

(57) ABSTRACT

A memory system may be connected to a host device. The memory system includes a nonvolatile memory and a controller configured to control the nonvolatile memory to reduce an amount of power consumption of the memory system based on a first instruction received from a host device connected to the memory system.

18 Claims, 23 Drawing Sheets

(56) References Cited

U.S. PATENT DOCUMENTS

2022/0043586 A1* 2/2022 Liang .................... G06F 3/0679
2023/0350482 A1* 11/2023 Xiong ................... G06F 1/3225

FOREIGN PATENT DOCUMENTS

| JP | 2018-120439 A | 8/2018 |
| JP | 2018-169979 | 11/2018 |
| JP | 2019-149197 A | 9/2019 |

* cited by examiner

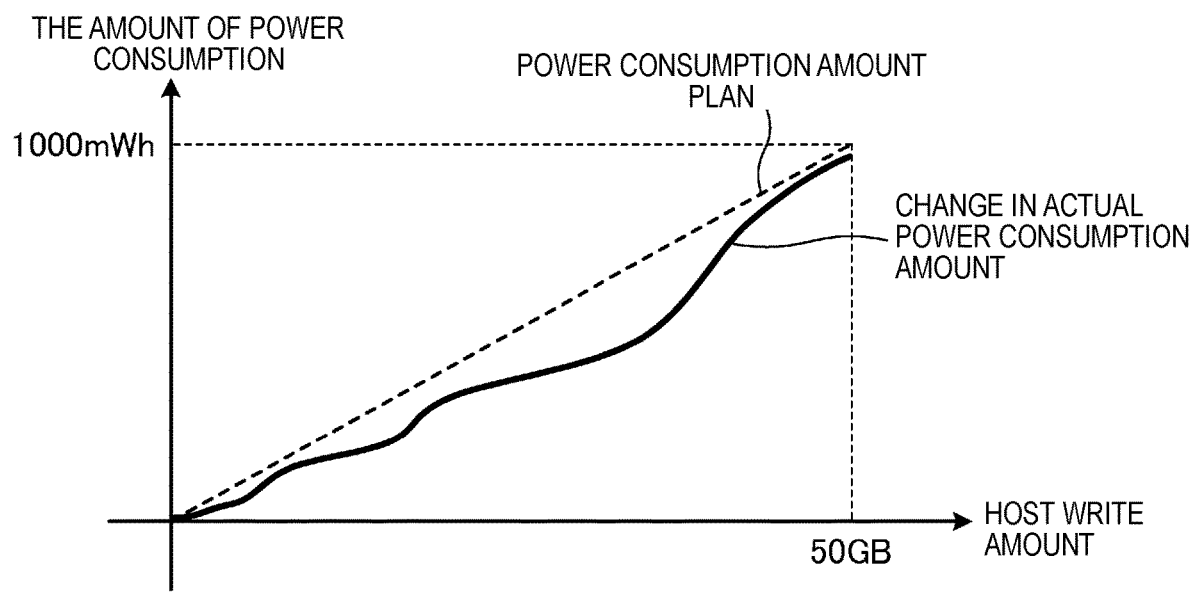

MEMORY SYSTEM, INFORMATION PROCESSING SYSTEM, AND HOST DEVICE

CROSS-REFERENCE TO RELATED APPLICATION(S)

This application is based upon and claims the benefit of priority from Japanese Patent Application No. 2021-047518, filed on Mar. 22, 2021, the entire contents of which are incorporated herein by reference.

FIELD

Embodiments described herein relate generally to a memory system, an information processing system, and a host device.

BACKGROUND

A memory system such as an SSD (Solid State Drive) includes a controller and a nonvolatile memory. The controller controls a process of transmitting data, which is read from the nonvolatile memory, to the host device, a process of writing data, which is received from the host device, in the nonvolatile memory, and the like according to a request from the host device. Further, the controller executes a transcription process for moving data in the nonvolatile memory, and the like. In the memory system, power is consumed not only in data transmission/reception between the host device and the nonvolatile memory but also in the transcription process.

DESCRIPTION OF THE DRAWINGS

FIG. 17 is a schematic diagram illustrating an example of a power consumption amount plan generated by a controller of a fourth embodiment.

DETAILED DESCRIPTION

Embodiments provide a memory system whose power consumption may be controlled by a host device, an information processing system, and a host device capable of controlling the power consumption of the memory system.

In general, according to one embodiment, a memory system may be connected to a host device. The memory system includes a nonvolatile memory and a controller configured to control the nonvolatile memory to reduce an amount of power consumption of the memory system based on a first instruction received from a host device connected to the memory system.

Hereinafter, a memory system, an information processing system, and a host device according to embodiments will be described in detail with reference to the accompanying drawings. It is noted that the present disclosure is not limited to these embodiments.

First Embodiment

Figure 1:
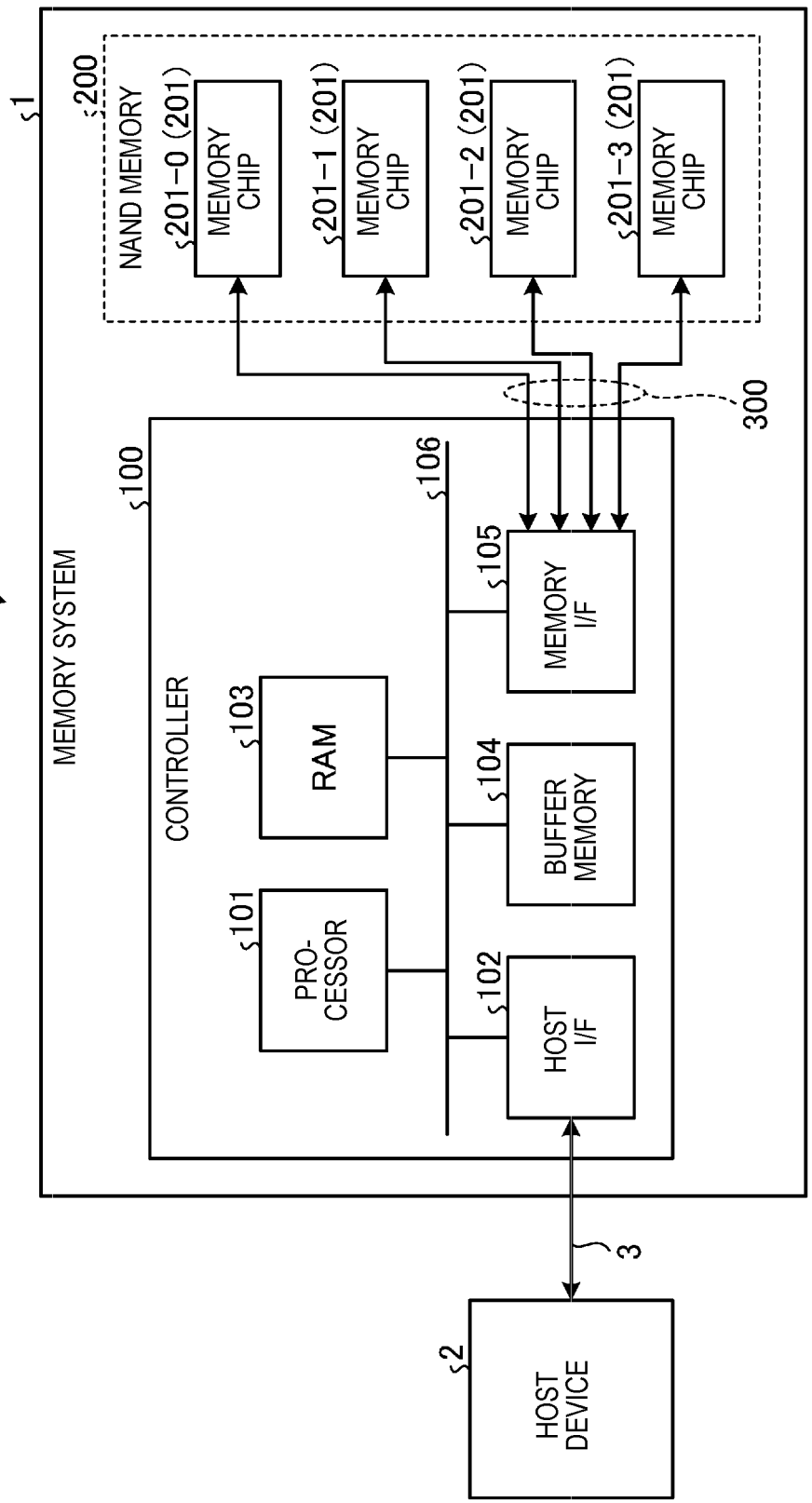
FIG. 1 is a schematic diagram illustrating an example of the configuration of an information processing system of a first embodiment.

FIG. 1 is a schematic diagram illustrating an example of the configuration of an information processing system 10 of a first embodiment.

The information processing system 10 is, for example, various computers, servers, and the like. Among various computers, portable computers include laptop-type personal computers, mobile phones, smartphones, portable music players, image pickup devices, and the like. A host device 2 is, for example, a processor in the information processing system 10. A memory system 1 is, for example, an SSD. The memory system 1 may be externally connected to various computers, servers, and the like.

The memory system 1 is connected to the host device 2 by a communication interface 3. The host device 2 may use the memory system 1 as data storage. The standard of the communication interface 3 is not limited to a specific standard. For example, SAS (Serial Attached SCSI), SATA (Serial ATA), PCI express (PCIe®), NVMe express (NVMe®), and the like may be adopted as the standard of the communication interface 3.

The memory system 1 receives an access command (e.g., a write command or a read command) from the host device 2. The memory system 1 stores user data requested to be written, according to the write command. The memory system 1 transmits user data requested to be read, to the host device 2 according to the read command.

The access command includes a logical address. The memory system. 1 provides the host device 2 with a logical address space. The logical address indicates a position in the address space. The host device 2 uses the logical address to designate a position at which user data is written or a position at which user data is read. That is, the logical address is position information designated by the host device 2.

The memory system 1 includes a controller 100 and a NAND memory 200. The controller 100 is connected to the NAND memory 200 by a memory bus 300. The NAND memory 200 is an example of a nonvolatile memory.

The controller 100 executes control of the NAND memory 200.

The controller 100 writes data requested to be written from the host device 2, in the NAND memory 200, or reads data requested to be read from the host device 2, from the NAND memory 200 and sends it to the host device 2. That is, the controller 100 executes data transfer between the host device 2 and the NAND memory 200. The data transfer between the host device 2 and the NAND memory 200 will be referred to as a host access process.

Further, the controller 100 executes a transcription process of transcribing data in the NAND memory 200. The transcription process includes garbage collection, eviction, and the like. The details of the transcription process will be described later.

The controller 100 includes a processor 101, a host interface (host I/F) 102, a RAM (Random Access Memory) 103, a buffer memory 104, a memory interface (memory I/F) 105, and an internal bus 106. The processor 101, the host I/F 102, the RAM 103, the buffer memory 104, and the memory I/F 105 are electrically connected to the internal bus 106.

The controller 100 may be configured as a SoC (System-on-a-Chip). Alternatively, the controller 100 may be implemented by a plurality of chips. The RAM 103 or the buffer memory 104 may be disposed outside the controller 100.

The host I/F 102 outputs the access command, the user data, etc. which are received from the host device 2, to the internal bus 106. The user data is sent to the buffer memory 104 via the internal bus 106.

Further, the host I/F 102 transmits user data read from the NAND memory 200, a response from the processor 101, and the like to the host device 2.

The buffer memory 104 is a memory that functions as a buffer for data transfer between the host device 2 and the NAND memory 200. The buffer memory 104 is implemented by, for example, a volatile memory such as SRAM (Static Random Access Memory) or SDRAM (Synchronous Dynamic Random Access Memory). The types of memories that make up the buffer memory 104 are not limited thereto. The buffer memory 104 may be implemented by any kind of nonvolatile memory.

The memory I/F 105 controls a process of writing user data and the like to the NAND memory 200 and a process of reading user data and the like from the NAND memory 200, based on an instruction from the processor 101.

The processor 101 is a circuit capable of executing a computer program. The processor 101 is, for example, a CPU (Central Processing Unit). The processor 101 comprehensively controls the respective components of the controller 100 based on a firmware program stored in a predetermined position (e.g., the NAND memory 200), thereby implementing various processes including the host access process and the transcription process.

In addition, some or all of the processes executed by the processor 101 may be executed by a hardware circuit. Some or all of the processes executed by the processor 101 may be executed by FPGA (Field-Programmable Gate Array) or ASIC (Application Specific Integrated Circuit).

The RAM 103 provides the processor 101 with a function as a buffer, a cache, or a working memory. The RAM 103 is implemented by a DRAM (Dynamic Random Access Memory), an SRAM, or a combination thereof. The types of memories that make up the RAM 103 are not limited thereto.

The controller 100 may include any component in place of or in addition to these components. For example, the controller 100 may include a circuit that performs a predetermined process (e.g., encoding or decoding) on the user data.

The NAND memory 200 may store the user data and the like in a nonvolatile manner. The NAND memory 200 includes one or more memory chips 201. Here, as an example, the NAND memory 200 includes four memory chips 201-0, 201-1, 201-2, and 201-3. Each memory chip 201 is a memory chip of a NAND flash memory.

Figure 2:
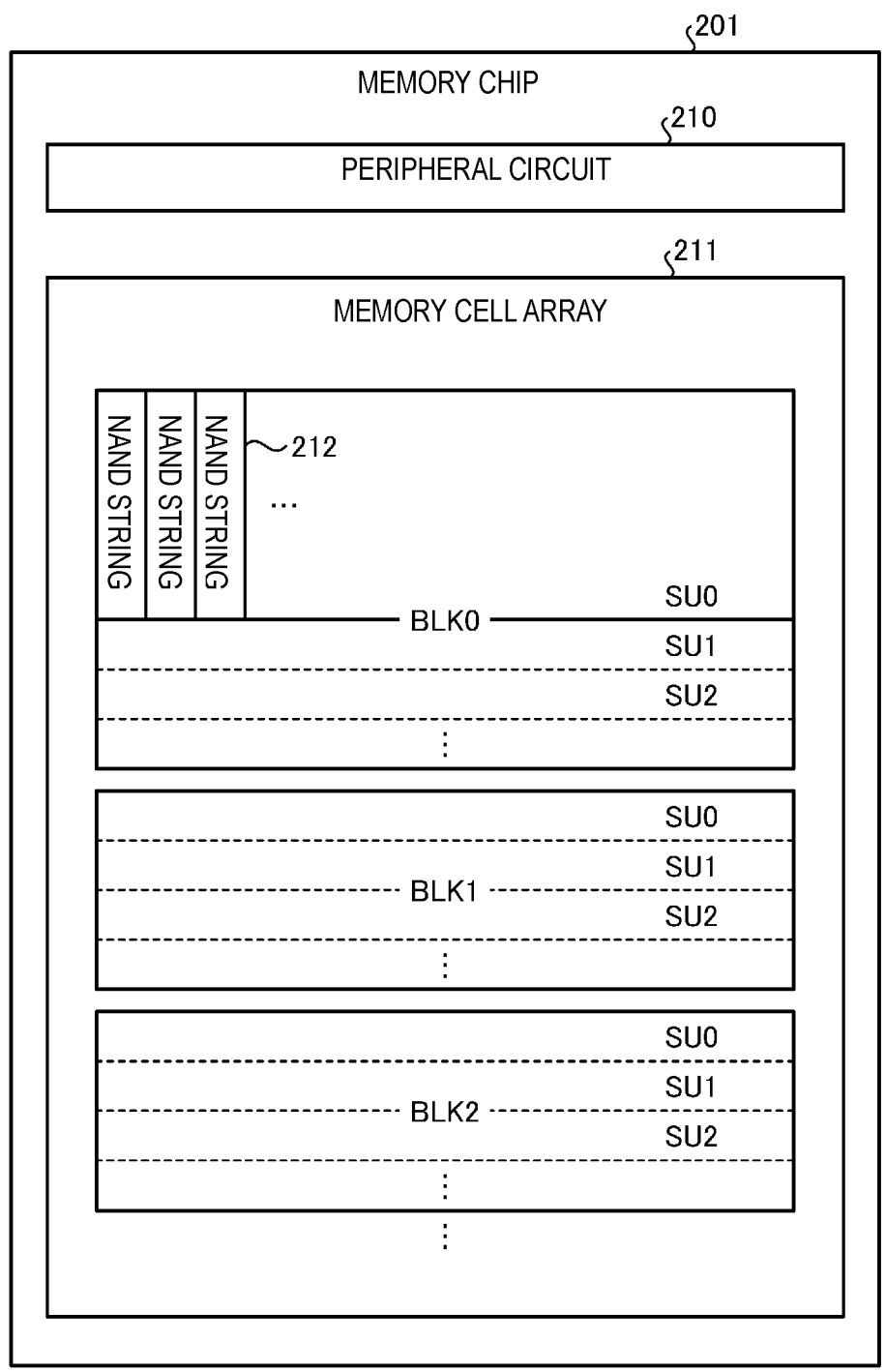
FIG. 2 is a schematic diagram illustrating an example of the configuration of a memory chip according to the first embodiment.

FIG. 2 is a schematic diagram illustrating an example of the configuration of a memory chip 201 according to a first embodiment. The memory chip 201 includes a peripheral circuit 210 and a memory cell array 211.

The memory cell array 211 includes a plurality of blocks BLK (BLK0, BLK1, BLK2, . . . ) each of which is a set of plural nonvolatile memory cell transistors. Each block BLK includes a plurality of string units SU (SU0, SU1, SU2, . . . ), each of which is a set of memory cell transistors associated with a word line and a bit line. Each of the string units SU includes a plurality of NAND strings 212 in which a plurality of memory cell transistors are connected in series. The number of NAND strings 212 in the string unit SU is freely chosen.

The peripheral circuit 210 includes, for example, a low decoder, a column decoder, a sense amplifier, a latch circuit, and a voltage generation circuit. According to an instruction from the controller 100, the peripheral circuit 210 executes an operation corresponding to the instruction for the memory cell array 211. The instruction from controller 100 includes write, read, and erase.

Figure 3:
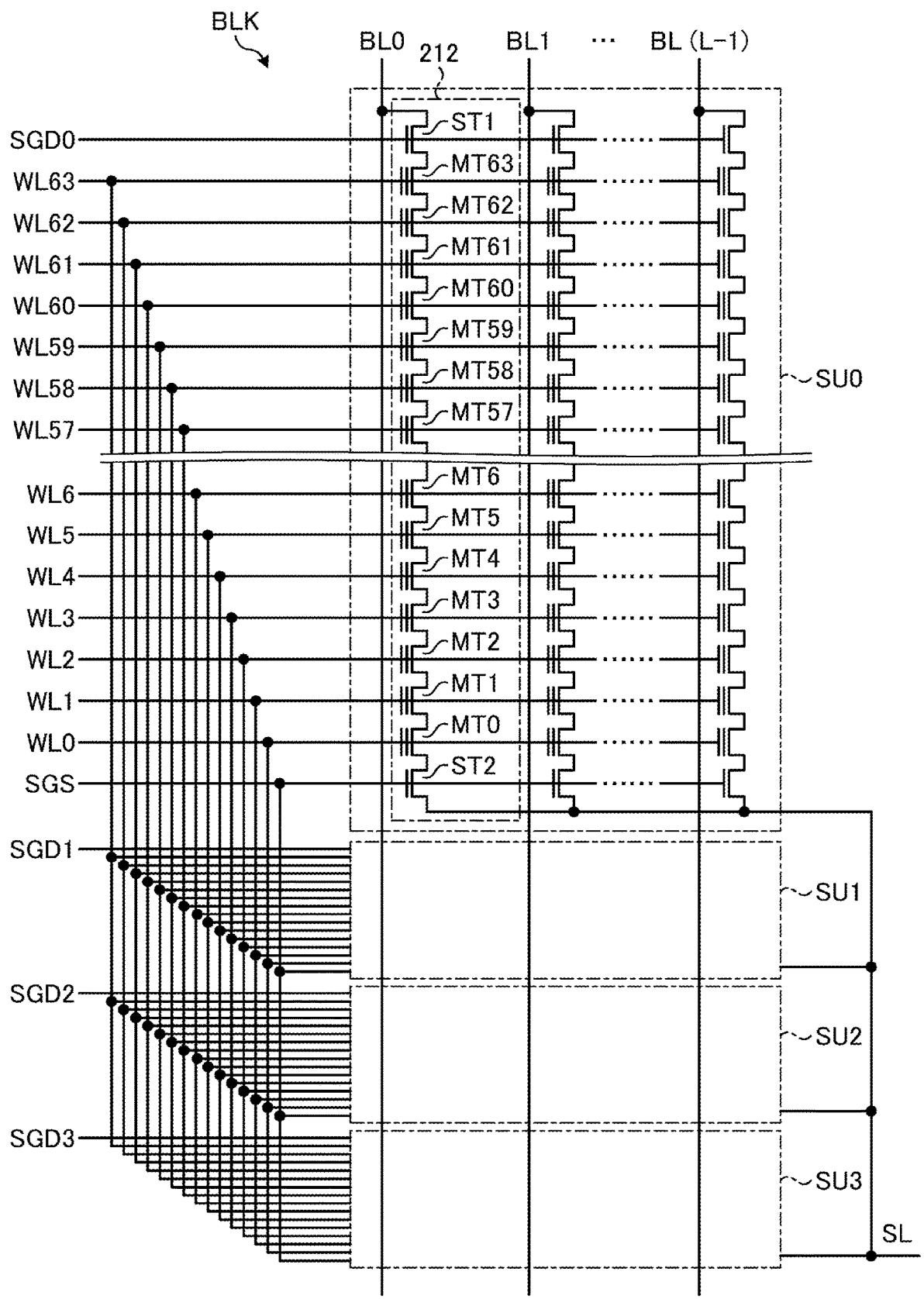
FIG. 3 is a schematic diagram illustrating a circuit configuration of a block according to the first embodiment.

FIG. 3 is a schematic diagram illustrating the circuit configuration of a block BLK according to the first embodiment. Each block BLK has the same configuration. The block BLK has, for example, four string units SU0 to SU3. Each string unit SU includes a plurality of NAND strings 212.

Each of the NAND strings 212 includes, for example, 64 memory cell transistors MT (MT0 to MT63) and select transistors ST1 and ST2. Each memory cell transistor MT includes a control gate and a charge storage layer and stores data in a nonvolatile manner. The 64 memory cell transistors MT (MT0 to MT63) are connected in series between the source of the select transistor ST1 and the drain of the select transistor ST2. Each memory cell transistor MT may be of a MONOS type in which an insulating film is used for the charge storage layer, or may be of an FG type in which a conductive film is used for the charge storage layer. Further, the number of memory cell transistors MT in the NAND string 212 is not limited to 64.

The gate of the select transistor ST1 in each of the string units SU0 to SU3 is connected to each of selected gate lines SGD0 to SGD3. Meanwhile, the gate of the select transistor ST2 in each of the string units SU0 to SU3 is connected in common to, for example, a selected gate line SGS. The gate of the select transistor ST2 in each of the string units SU0 to SU3 may be connected to selected gate line SGS0 to SGS3 (not illustrated) different for each string unit SU. The control gates of the memory cell transistors MT0 to MT63 in the same block BLK are connected in common to word lines WL0 to WL63, respectively.

The drain of the select transistor ST1 of each NAND string 212 in the string unit SU is connected to different bit lines BL (BL0 to BL(L−1), where L is a natural number of 2 or more). Further, the bit lines BL commonly connect one NAND string 212 in each string unit SU between the plurality of blocks BLK. Further, the source of each select transistor ST2 is connected in common to the source line SL.

That is, the string unit SU is a set of plural NAND strings 212, each of which is connected to a different bit line BL and connected to the same selected gate line SGD. Further, the block BLK is a set of plural string units SU having a common word line WL. The memory cell array 211 is a set of plural blocks BLK having at least one common bit line BL.

Write and read by the peripheral circuit 210 may be collectively executed for memory cell transistors MT connected to one word line WL in one string unit SU. A group of memory cell transistors MT that are collectively selected during the write and read will be referred to as a memory cell group MCG. Then, the unit of a collection of 1-bit data written or read in or from one memory cell group MCG will be referred to as a page.

Erase by the peripheral circuit 210 is executed in block BLK units. That is, all data stored in one block BLK are collectively erased.

The configuration of the memory cell array 211 is not limited to the configuration illustrated in FIGS. 2 and 3. For example, the memory cell array 211 may have a configuration in which the NAND strings 212 are arranged in two dimensions or three dimensions.

In the write for the memory cell array 211, the peripheral circuit 210 injects an amount of charges corresponding to data into the charge storage layer of each memory cell transistor MT that makes up a page of the write destination. Then, for the read from the memory cell array 211, the peripheral circuit 210 reads data according to the amount of charges accumulated in the charge storage layer from each memory cell transistor MT that makes up a page of the read destination.

Each memory cell transistor MT may store an n (n≥1)-bit value. A mode in which n is 1 is referred to as an SLC (Single Level Cell). When each memory cell transistor MT stores the n-bit value, the storage capacity per memory cell group MCG is equal to the size of n pages. A mode in which n is 2 is referred to as an MLC. A mode in which n is 3 is referred to as a TLC. A mode in which n is 4 is referred to as a QLC (Quad Level Cell). These modes in which an n-bit value is stored in one memory cell will be referred to as storage modes.

A threshold voltage of each memory cell transistor MT is controlled within a certain range by the peripheral circuit 210. The controllable range of the threshold voltage is divided into divisions of 2 to n-th power, each of which is assigned different n-bit values.

Figure 4:
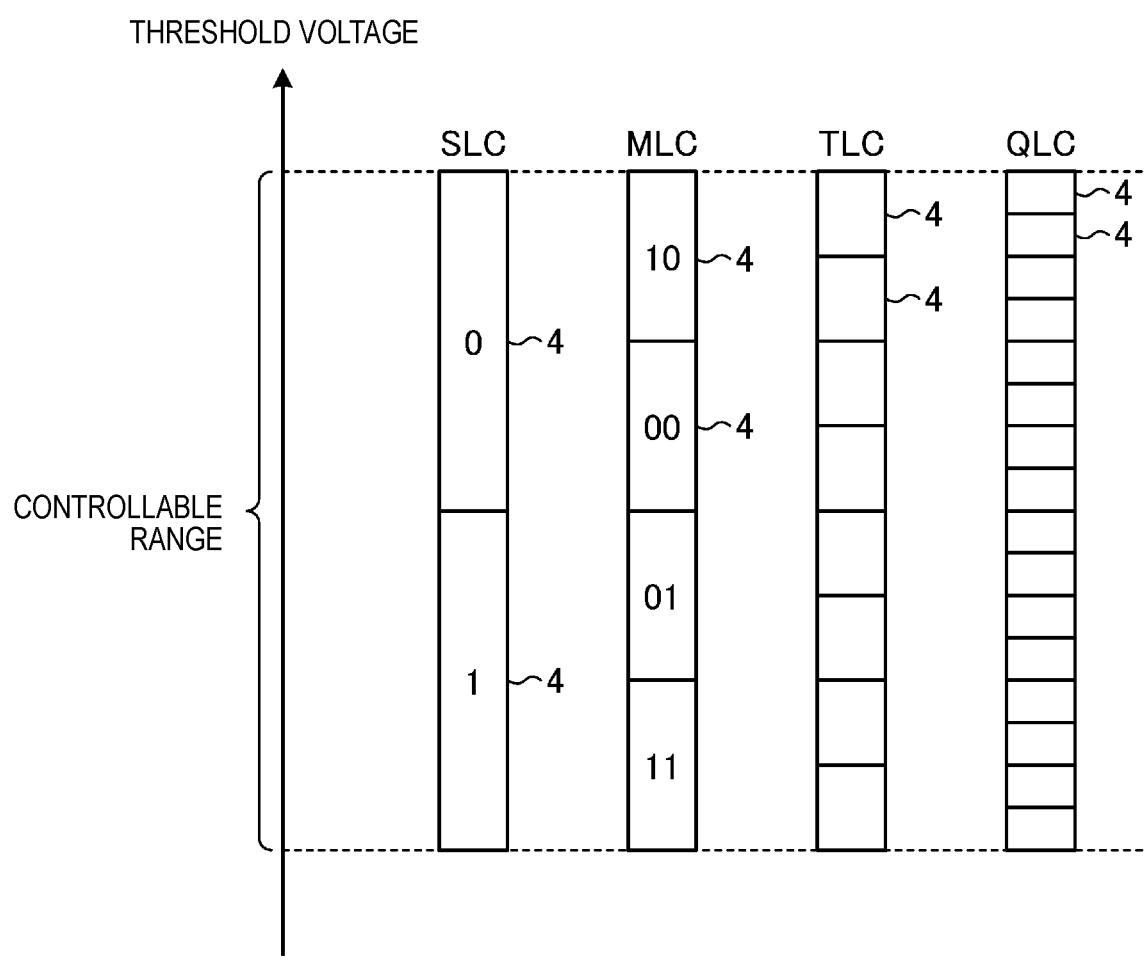
FIG. 4 is a diagram illustrating each division in various storage modes of the first embodiment.

FIG. 4 is a diagram illustrating each division in various storage modes of the first embodiment. As illustrated in FIG. 4, the range (controllable range) of the threshold voltage is divided into a plurality of divisions 4. For example, in the case of SLC, the range of threshold voltage is divided into two divisions 4. In the case of MLC, the range of threshold voltage is divided into four divisions 4. In the case of TLC, the range of the threshold voltage is divided into eight divisions 4. In the case of QLC, the range of threshold voltage is divided into 16 divisions 4. The larger the number of bits of a value is stored in one memory cell, the narrower the range of each division 4 is. A value is assigned to each division 4. In the case of SLC, a value "1" is assigned to a division 4 on the low voltage side, and a value "0" is assigned to a division 4 on the high voltage side. In the case of MLC, a value "11" is assigned to a division 4 on the lowest voltage side, and values "01," "00," and "10" are assigned to the other three divisions 4 in the order of voltage, respectively. The method of assigning a value to each division 4 is not limited to the above example. Hereinafter, n, that is, the number of bits of a value stored in one memory cell transistor MT, may be referred to as the number of levels.

For the write in the memory cell array 211, the peripheral circuit 210 injects an amount of charges corresponding to a division 4 to which data to be written is assigned, into the charge storage layer of each memory cell transistor MT that makes up the page of the write destination. For the read from the memory cell array 211, the peripheral circuit 210 determines a division 4 to which the threshold voltage of each memory cell transistor MT that makes up the page of the read destination belongs, and outputs data assigned to the division 4 acquired by the determination, as read data.

For the erase from the memory cell array 211, the peripheral circuit 210 applies an erase voltage to the substrate side of the memory cell array 211. Then, the peripheral circuit 210 conducts all word lines WL of a block BLK to be erased, to the ground potential. Then, in each memory cell transistor MT in a selected block BLK, charges stored in the charge storage layer is discharged. As a result, the state of each memory cell transistor MT in the selected block BLK transitions to a state in which data is considered to be erased (that is, the division 4 of the lowest voltage side).

The memory system 1 may be configured to be able to read and write only in a single storage mode. Alternatively, the memory system 1 may be configured to be able to switch between storage modes during operation. When the switching may be made between the storage modes, the range of the storage region of the switching unit is freely chosen. For example, the memory system 1 may be capable of switching between the storage modes in the unit of block BLK.

When the memory system 1 is configured to be able to switch between the storage modes during operation, a storage mode of a portion (e.g., some blocks BLK) of the storage region in the memory system 1 is fixed to a first storage mode, and a storage mode of the other portion (e.g., other blocks BLK) is fixed to a second storage mode different from the first storage mode, and the memory system 1 may select a block BLK of the write destination according to a storage mode to be used. Alternatively, the memory system 1 may be configured to be able to change the storage mode of the storage region (e.g., each block BLK) between the plurality of storage modes during operation.

In the following description, as an example, it is assumed that the memory system 1 is configured to be able to switch a storage mode between the SLC and the TLC.

Figure 5:
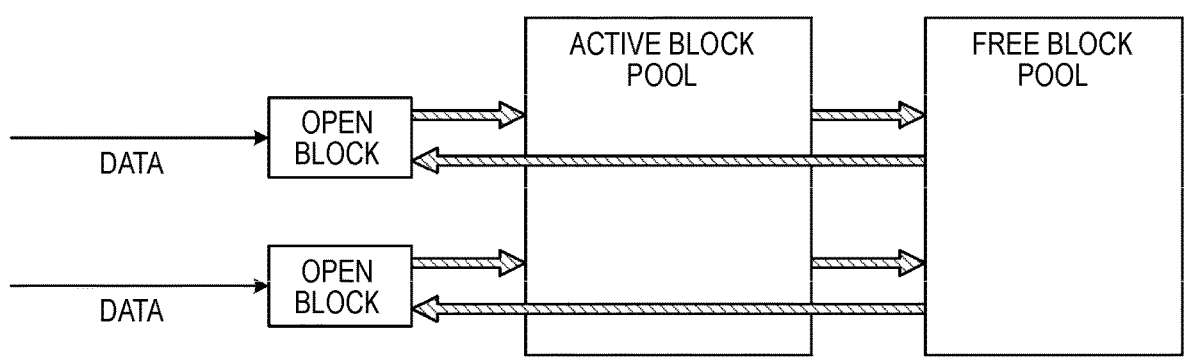
FIG. 5 is a diagram illustrating an example of the state transition of the block of the first embodiment.

Subsequently, the state transition of a block BLK will be described. FIG. 5 is a diagram illustrating an example of the state transition of a block BLK of the first embodiment. The hatched arrows indicate the state transitions of a block BLK, and the solid arrows indicate the movement of data.

The state of the block BLK includes at least an open block, an active block, and a free block. One or more active blocks make up an active block pool, and one or more free blocks make up a free block pool.

The open block is a block in the middle of data write. That is, the open block is a block in which a region in which data may be written is left.

The active block is a block that may not be reused yet, among blocks for which data write has been completed. Among the blocks for which data write has been completed, a block in which valid user data is stored is managed as the active block. Reuse means transitioning to the open block.

The free block is a block in which valid user data is not stored. The free block is a reusable block.

For example, after data for one block BLK is written in the open block, the open block transitions to the active block. Data stored in the active block is in either a valid state or an invalid state.

In a state where certain data (referred to as first data) is stored in the active block, when second data designated with the same logical address value as the logical address value designated when the first data is sent is sent from the host device 2, the controller 100 writes the second data in a free page of the open block and manages the first data stored in the active block, as invalid data. Therefore, valid user data and invalid user data may coexist in the data stored in the active block.

In addition, sending new data designated with the same logical address value as the logical address value designated when the host device 2 sends old data to the memory system 1 will be referred to as rewrite.

The active block transitions to the free block by garbage collection. The garbage collection refers to a process of transcribing valid data stored in a block BLK, which is the active block, in a block BLK, which is the open block, to invalidate all data stored in the block BLK of a transcription source. As a result, the block BLK of the transcription source transitions from the active block to the free block. Further, the transcription may be paraphrased as transfer or movement.

The free block transitions to the open block after the stored data is erased.

The validity of data means that a position at which the data is stored is associated with any logical address value. The invalidity of data means that the position where the data is stored is not associated with any logical address value. Further, the "free" state here means a state in which neither invalid data nor valid data is stored. That is, a free page is a free region in which data may be written. The controller 100 maintains and updates the correspondence between a position in the block BLK and a logical address value.

Open blocks may be prepared individually for each of the host access process and the transcription process. An open block for the host access process and an open block for transcription process may be prepared. When the storage mode may be switched in the unit of block BLK, the open block may be prepared for each storage mode.

The transcription process includes eviction in addition to the garbage collection. The eviction is executed when the memory system 1 is configured to be able to use two or more different storage modes.

For example, consider a memory system configured to be able to switch the storage mode at the time of write between the first storage mode and the second storage mode having a smaller number of levels than the first storage mode. In such a memory system, the write in the second storage mode requires a storage region of larger capacity than the write in the first storage mode. Accordingly, when the write in the second storage mode is executed, the consumption of the free block is larger than in the case where the write in the first storage mode is executed, and the total amount of data that may be written in the memory system is reduced. Therefore, when the write of data in the second storage mode is completed, the controller later reads out the data and executes a process of writing back the read data in the first storage mode. As a result, the number of free blocks is restored and the total amount of data that may be written in the memory system is restored. The eviction is a process of, after the write of data in the second storage mode is completed, reading out the data and writing back the read data in the first storage mode.

In the eviction, for example, the active block in which the data is written in the second storage mode is selected as the transcription source, and the valid data is read from the selected transcription source. Then, the read valid data is written in another block BLK (the open block) in the first storage mode. When the movement of all valid data in the block BLK of the transcription source is completed, the block BLK of the transcription source transitions from the active block to the free block. Accordingly, free blocks are also generated by the eviction.

The host device 2 may want to control the power consumption of the memory system 1. For example, when the information processing system 10 is a portable computer provided with a battery, it is conceivable to control the power consumption of the memory system 1 depending on whether or not the information processing system 10 is connected to a power supply. When the information processing system 10 is connected to the power supply, the information processing system 10 may use abundant power from the power supply, so that the amount of power required by the memory system 1 may be sufficiently supplied to the memory system 1. When the information processing system 10 is not connected to the power supply and operates by the energy stored in the battery, the information processing system 10 supplies the less amount of power to the memory system 1 than the case where the information processing system 10 is connected to the power supply.

In an embodiment, the memory system 1 is configured to be able to receive information related to the amount of power from the host device 2. In the first embodiment, the memory system 1 may receive a power amount limit instruction as an example of the information related to the amount of power. The operation mode of the memory system 1 transitions to an operation mode in which the amount of power consumption is reduced when the power amount limit instruction is received. An operation mode in which the amount of power consumption is not reduced will be referred to as a normal mode. The operation mode in which the amount of power consumption is reduced will be referred to as a power amount limit mode.

The controller 100 reduces the processing amount of the transcription process in the power amount limit mode as compared with the case in the normal mode. A method of reducing the processing amount of the transcription process is not limited to a specific method.

In one example, the controller 100 makes the execution frequency of the transcription process different between the normal mode and the power amount limit mode. That is, the controller 100 makes the execution frequency of the transcription process in the power amount limit mode lower than the execution frequency of the transcription process in the normal mode. In the power amount limit mode, the processing amount of the transcription process is reduced because the execution frequency of the transcription process is reduced, as compared with the case of the normal mode. In the power amount limit mode, the amount of power consumption of the memory system 1 is reduced because the processing amount of the transcription process is reduced, as compared with the case of the normal mode.

In another example, the controller 100 makes the start condition of the transcription process different between the normal mode and the power amount limit mode. For example, when it is the start condition of the garbage collection (or the eviction) that the number of free blocks is lower than a determination threshold value, different values are used as the determination threshold values between the normal mode and the power amount limit mode. Specifically, the controller 100 uses a first set value as the determination threshold value in the normal mode, and uses a second set value smaller than the first set value, as the determination threshold value in the power amount limit mode. As a result, in the power amount limit mode, the garbage collection (or the eviction) is less likely to be executed than in the normal mode, thereby reducing the processing amount of the garbage collection (or the eviction). In the power amount limit mode, the amount of power consumption of the memory system 1 is reduced because the processing amount of the garbage collection (or the eviction) is reduced, as compared with the case in the normal mode.

A process which is a target for which the processing amount is reduced in the power amount limit mode may be all transcription processes or only some of the transcription processes. For example, only the garbage collection may be the target, only the eviction may be the target, or both may be the target.

In this way, the controller 100 executes the operation according to the operation mode. That is, the operation mode of the memory system 1 may be considered as the operation mode of the controller 100. Hereinafter, the operation mode of the controller 100 means the operation mode of the memory system 1.

Subsequently, the operation of the information processing system 10 according to the first embodiment will be described.

Figure 6:
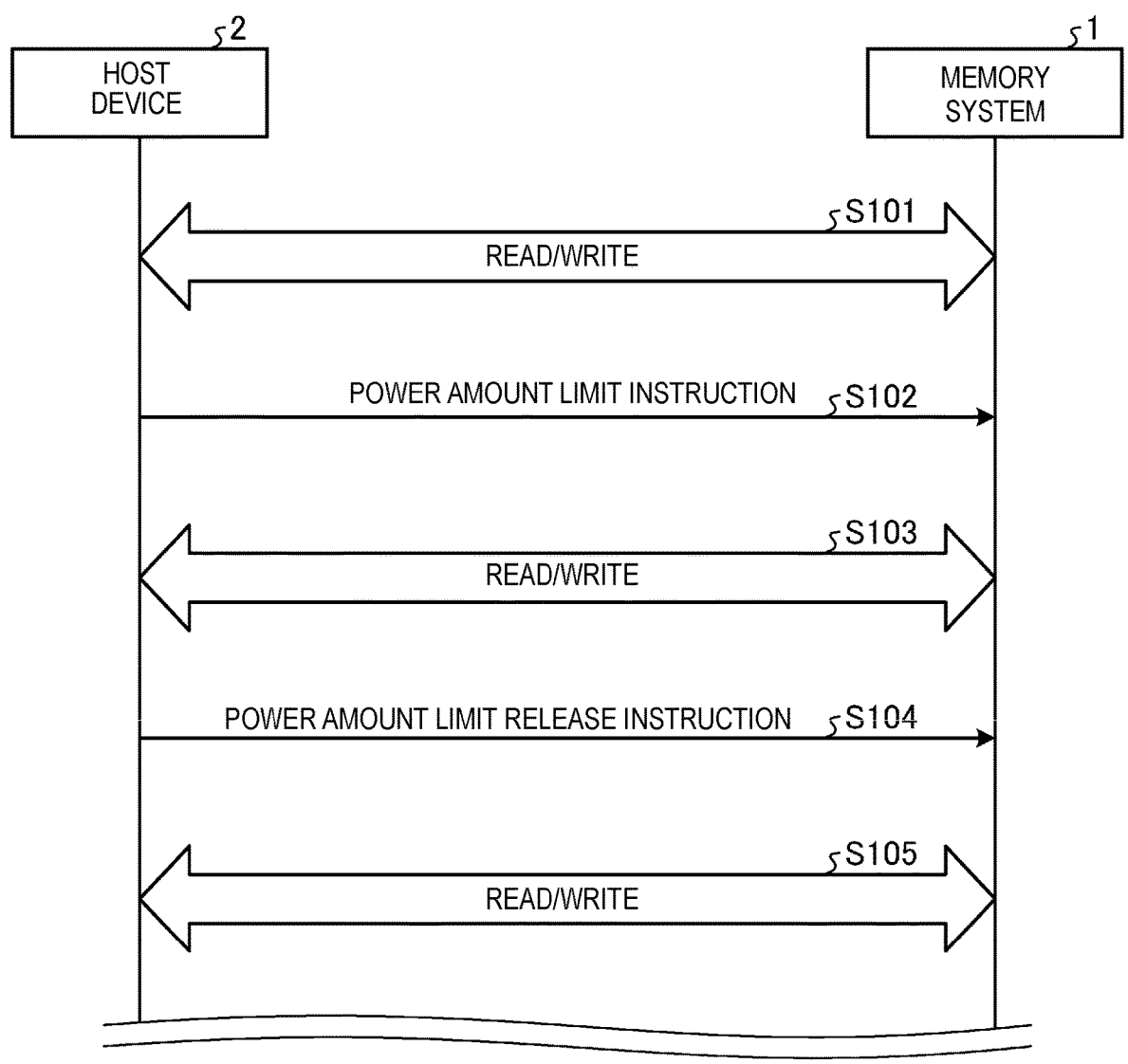
FIG. 6 is a diagram illustrating an example of information transferred between a host device and a memory system of the first embodiment.

FIG. 6 is a diagram illustrating an example of information transferred between the host device 2 and the memory system 1 of the first embodiment. In the description of FIG. 6, it is assumed that the operation mode of the memory system 1 is the normal mode in an initial state.

The host device 2 may execute data read/data write from/in the memory system 1 in the normal mode (S101). When the host device 2 wants to transition the operation mode of the memory system 1 to the power amount limit mode, the host device 2 transmits a power amount limit instruction to the memory system 1 (S102).

For example, in NVMe® and the like, the actual operation is not defined for all command values. A vendor may assign a command value whose operation is undefined, to any operation. The command value that such a vendor may assign to any operation is called vendor-specific. The vendor may assign the vendor-specific command value prepared in accordance with the standard of the communication interface 3 to the power amount limit instruction. Another vendor-specific command value may be assigned to a power amount limit release instruction which will be described later.

Alternatively, the power amount limit instruction (and the power amount limit release instruction) may be incorporated in the standard of the communication interface 3.

Alternatively, the host device 2 and the memory system 1 are connected by a dedicated signal line for transferring the power amount limit instruction (and the power amount limit release instruction), and the host device 2 may transmit the power amount limit instruction (and the power amount limit release instruction) to the memory system 1 via the dedicated signal line.

When receiving the power amount limit instruction, the memory system 1 transitions from the normal mode to the power amount limit mode. The host device 2 may execute data read/data write from/in the memory system 1 in the power amount limit mode (S103).

When the host device 2 wants to return the operation mode of the memory system 1 from the power amount limit mode to the normal mode, the host device 2 transmits the power amount limit release instruction to the memory system 1 (S104). When receiving the power amount limit release instruction, the memory system 1 transitions from the power amount limit mode to the normal mode. The host device 2 may execute data read/data write from/in the memory system 1 in the normal mode (S105).

After that, the host device 2 and the memory system 1 may repeat the same operations as in S101 to S105.

Figure 7:
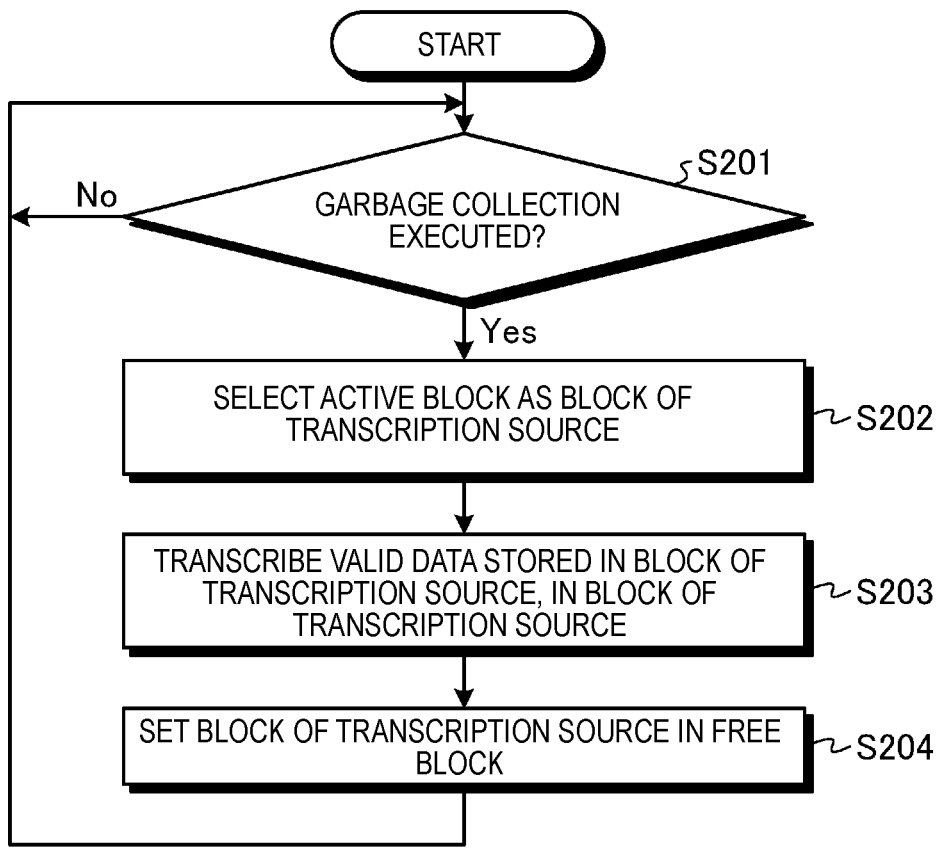
FIG. 7 is a flowchart illustrating an example of the operation of garbage collection (compaction), which is an example of a transcription process of the first embodiment.

FIG. 7 is a flowchart illustrating an example of the operation of garbage collection, which is an example of the transcription process of the first embodiment.

The controller 100 determines whether or not to execute the garbage collection (S201). A method of determining whether or not to execute the garbage collection is not limited to a specific method. For example, as described above, the controller 100 may determine whether or not to execute the garbage collection based on a comparison between the number of free blocks and the determination threshold value. Alternatively, the controller 100 may determine whether or not to execute the garbage collection so that the execution frequency of the garbage collection becomes a predetermined frequency.

When it is determined that the garbage collection is not executed (No in S201), the controller 100 executes the determination process of S201 again.

When it is determined that the garbage collection is executed (Yes in S201), the controller 100 selects one active block as a block BLK of the transcription source (S202).

Then, the controller 100 transcribes all the valid data stored in the block BLK of the transcription source in a block BLK of the transcription destination (S203). That is, the controller 100 copies all the valid data stored in the transcription source block BLK to the transcription destination block BLK to invalidate all the data stored in the transcription source block BLK. As a result, the valid data stored in the transcription source block BLK is transcribed in the transcription destination block BLK. The transcription destination block BLK is a block BLK set as the open block.

Then, the controller 100 sets the transcription source block BLK as the free block (S204).

Then, the control proceeds to S201.

Figure 8:
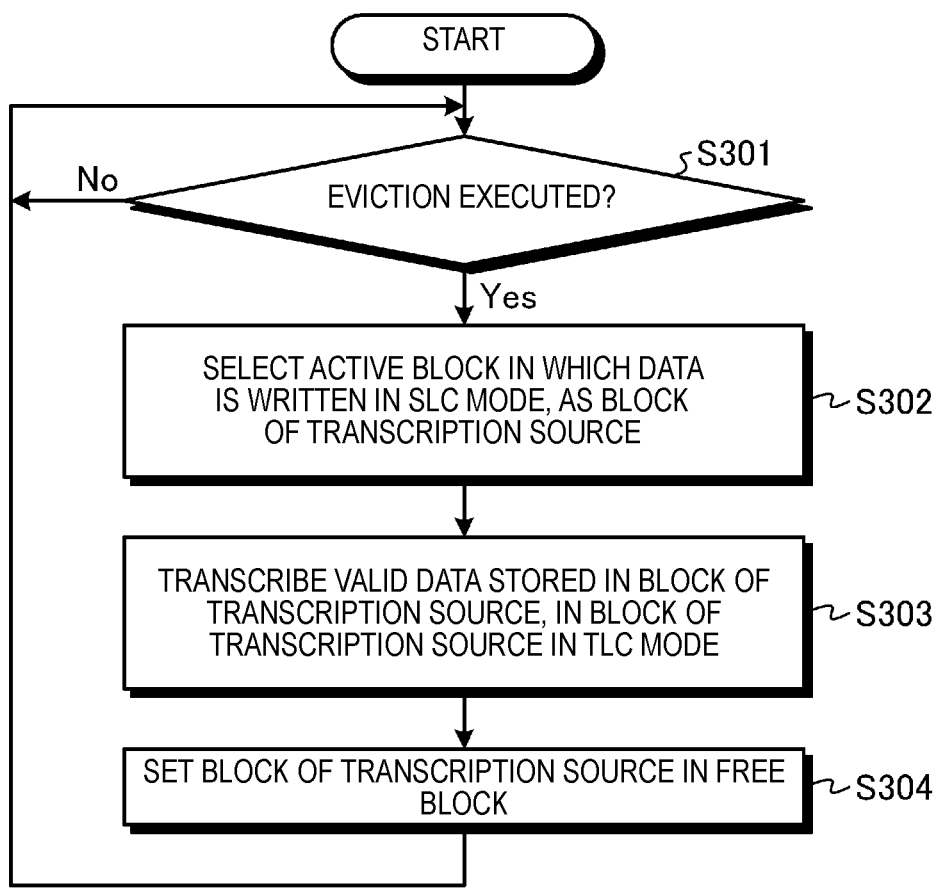
FIG. 8 is a flowchart illustrating an example of an eviction operation, which is another example of the transcription process of the first embodiment.

FIG. 8 is a flowchart illustrating an example of the operation of the eviction, which is another example of the transcription process of the first embodiment.

The controller 100 determines whether or not to execute the eviction (S301). A method of determining whether or not to execute the eviction is not limited to a specific method. For example, as described above, the controller 100 may determine whether or not to execute the eviction based on a comparison between the number of free blocks and the determination threshold value. Alternatively, the controller 100 may determine whether or not to execute the eviction so that the execution frequency of the eviction becomes a predetermined frequency.

When it is determined that the eviction is not executed (No in S301), the controller 100 executes the determination process of S301 again.

When it is determined that the eviction is executed (Yes in S301), the controller 100 selects one active block whose data is written in the SLC mode, as a transcription source block BLK (S302).

Then, the controller 100 transfers all the valid data stored in the transcription source block BLK in a transcription destination block BLK in the TLC mode (S303). That is, the controller 100 writes all the valid data stored in the transcription source block BLK in the transcription destination block BLK in the TLC mode to invalidate all the data stored in the transcription source block BLK. As a result, the valid data stored in the transcription source block BLK is transcribed in the transcription destination block BLK. The transcription destination block BLK is a block BLK set as the open block, and also a block BLK whose data is written in the TLC mode.

Then, the controller 100 sets the transcription source block BLK as the free block (S304).

Then, the control proceeds to S301.

Figure 9:
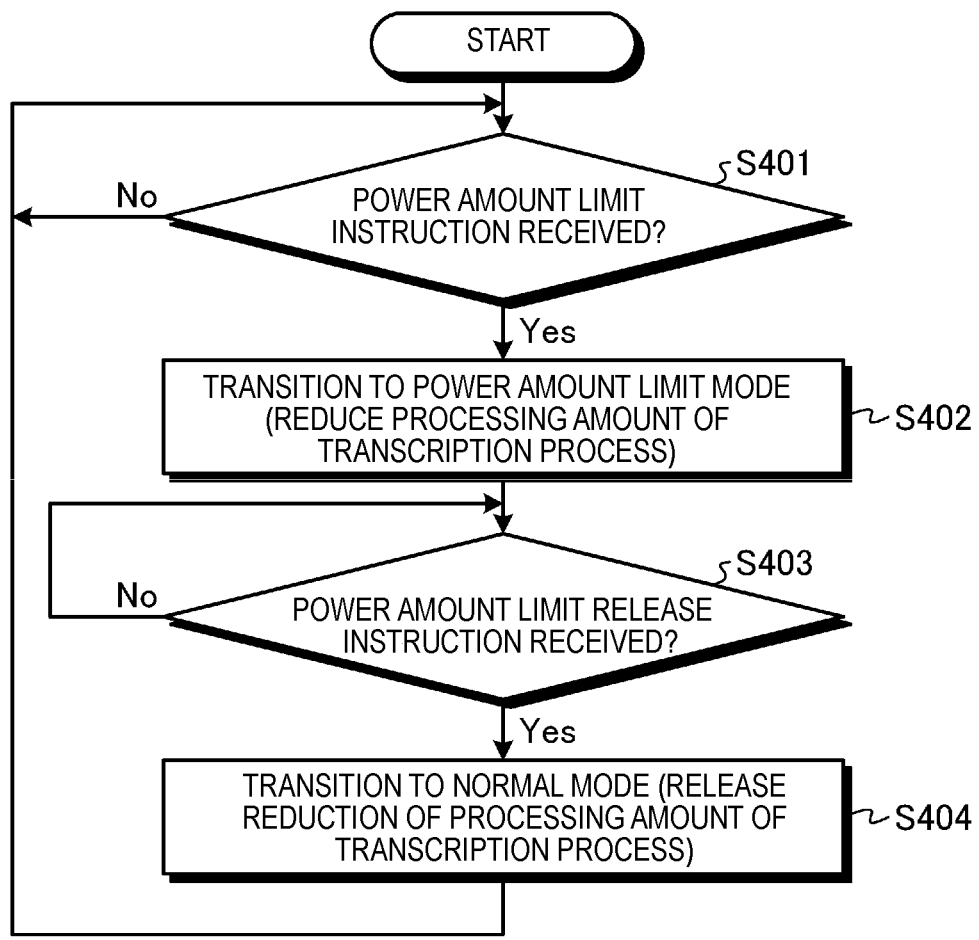
FIG. 9 is a flowchart illustrating an example of an operation related to the transition of an operation mode of the first embodiment.

FIG. 9 is a flowchart illustrating an example of an operation related to the transition of the operation mode of the first embodiment. In the description of FIG. 9, it is assumed that the operation mode of the memory system 1 in an initial state is the normal mode.

The controller 100 determines whether or not a power amount limit instruction has been received from the host device 2 (S401). When it is determined that the power amount limit instruction has not been received (No in S401), the controller 100 executes the determination process of S401 again.

When it is determined that the power amount limit instruction has been received (Yes in S401), the controller 100 transitions from the normal mode to the power amount limit mode (S402). That is, the controller 100 reduces the processing amount of the transcription process.

After S402, the controller 100 determines whether or not a power amount limit release instruction has been received from the host device 2 (S403). When it is determined that the power amount limit release instruction has not been received (No in S403), the controller 100 executes the determination process of S403 again.

When it is determined that the power amount limit release instruction has been received (Yes in S403), the controller 100 transitions from the power amount limit mode to the normal mode (S404). That is, the controller 100 releases the reduction of the processing amount of the transcription process.

Then, the control proceeds to S401.

In the above description, the memory system 1 transitions from the power amount limit mode to the normal mode according to the power amount limit release instruction. A trigger for transitioning from the power amount limit mode to the normal mode is not limited to the reception of the power amount limit release instruction. The controller 100 may autonomously transition the operation mode of the memory system 1 from the power amount limit mode to the normal mode. For example, when the elapsed time from the transition of the operation mode of the memory system 1 to the power amount limit mode reaches a predetermined time, the controller 100 may transition the operation mode of the memory system 1 from the power amount limit mode to the normal mode. Alternatively, when it becomes difficult to continue the reduction of the processing amount of the transcription process, the controller 100 may transition the operation mode of the memory system 1 from the power amount limit mode to the normal mode.

As described above, according to the first embodiment, the controller 100 may execute the data transcription process for transferring data between the host device 2 and the NAND memory 200, and the transcription process for transcribing data in the NAND memory 200. Then, the controller 100 reduces the processing amount of the transcription process according to the power amount limit instruction from the host device 2.

With the above configuration of the memory system 1, it is possible to control the amount of power consumption of the memory system 1 by the host device 2.

Second Embodiment

In a second embodiment, the operation of the garbage collection in the transcription process differs between the normal mode and the power amount limit mode. More specifically, a policy for selecting a transcription source block BLK in the garbage collection differs between the normal mode and the power amount limit mode. In the second embodiment, points different from the first embodiment will be described, and the same points as those in the first embodiment will be omitted or briefly described. The second embodiment may be used in combination with the first embodiment.

Figure 10:
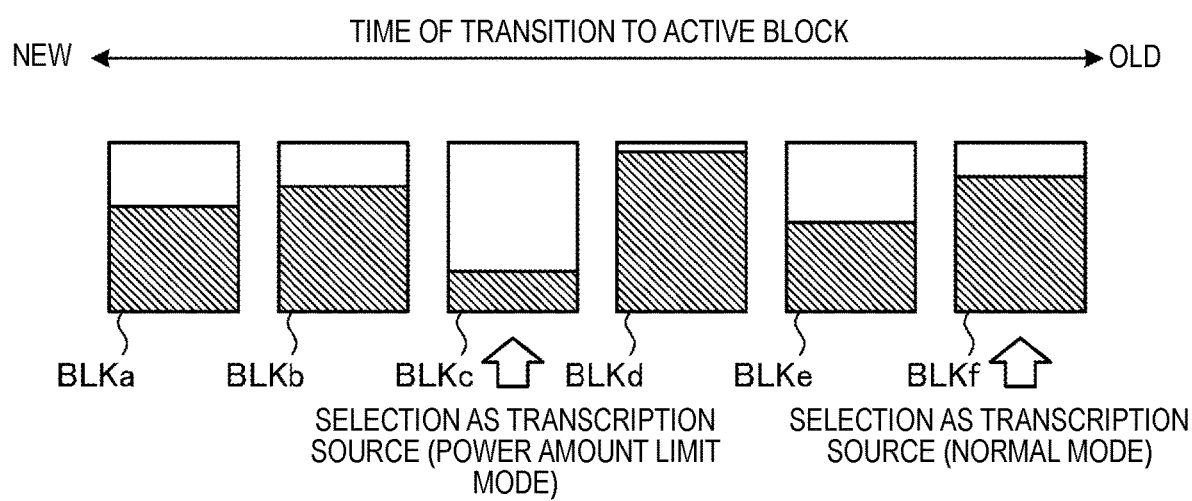
FIG. 10 is a diagram illustrating an example of a method of selecting a block BLK of a transcription source in a garbage collection of a second embodiment.

FIG. 10 is a diagram illustrating an example of a method of selecting a transcription source block BLK in the garbage collection of the second embodiment.

A plurality of blocks (here, six blocks as an example) are drawn in FIG. 10. It is assumed that the six blocks BLK are active blocks and the active blocks of the memory system 1 are all of the six blocks BLK. Further, in FIG. 10, the six blocks BLK are arranged in the order of time when they transition to the active blocks (in other words, time when data is last written). The six blocks BLK will be referred to as blocks BLKa to BLKf. Here, the time when the block BLKa transitions to the active block is the newest, and the time when the blocks transition to the active blocks is newer in the order of block BLKa, block BLKb, block BLKc, block BLKd, and block BLKe. In each of the blocks BLKa to BLKf, the area of the shaded region corresponds to the amount of valid data stored.

The controller 100 (e.g., the processor 101) records the order of time when each block BLK became the active block and the amount of valid data stored in each block BLK, and updates the recorded contents as needed.

In the power amount limit mode, the controller 100 selects a block BLK having the smallest amount of stored valid data as a transcription source block BLK in the garbage collection. In the example of FIG. 10, the controller 100 selects, for example, the block BLKc out of the six blocks BLKa to BLKf, each of which is the active block, as the transcription source block BLK.

In the garbage collection, the transcription source block BLK may be the free block as the valid data moves from the transcription source block BLK to a transcription destination block BLK. The smaller the amount of valid data stored in the transcription source block BLK, the smaller the amount of data moved to generate one free block, so that the amount of power required to generate one free block is small. In the power amount limit mode, the block BLK having the smallest amount of stored valid data is selected as the transcription source block BLK in the garbage collection, so that the amount of power required for the garbage collection is reduced.

In the power amount limit mode, there may be a case where the block BLK having the smallest amount of stored valid data is not necessarily selected as the transcription source block BLK.

For example, the controller 100 may record the amount of valid data stored in each block BLK, as inaccurate coarse-grained numerical information. In such a case, it is possible to find a block BLK with a small amount of stored valid data.

In another example, there may be a time lag between the timing of updating the amount of valid data stored in each block BLK recorded by the controller 100 and the timing of fluctuation in the amount of valid data stored in each block BLK. Even in such a case, it is possible to find a block BLK with a small amount of stored valid data.

In these examples, it is possible to preferentially select the block BLK with a small amount of stored valid data as the transcription source block BLK. In the power amount limit mode, as long as the block BLK having a small amount of stored valid data is preferentially selected as the transcription source block BLK, a method of selecting a transcription source block BLK may be changed in various ways.

In yet another example of the method of preferentially selecting a block BLK with a small amount of stored valid data as the transcription source block BLK, a method in which the controller 100 stores an amount sufficiently small for the capacity of one block BLK, as a threshold value, and a transcription source block BLK in the garbage collection is selected based on a comparison between the amount of stored valid data and the threshold value may be considered. The controller 100 may search for a block BLK having the amount of stored valid data less than the threshold value and may select the first found block BLK as the transcription source block BLK in the garbage collection.

In the normal mode, the controller 100 (e.g., the processor 101) selects a block BLK with the oldest time of transition to the active block, in other words, a block BLK with the oldest time when data is last written, as a transcription source block BLK in the garbage collection. In the example of FIG. 10, the controller 100 selects the block BLKf as the transcription source block BLK.

The fact that data remains valid in a block BLK with the old time when the block BLK became the active block means that the data was not rewritten for a long period of time. The state of data that tends to remain valid for such a long period of time will be referred to as cold. Meanwhile, the state of data that is rewritten in a short period of time and tends to become invalid will be referred to as hot.

There is a high possibility that rewrite of cold data will not be executed for a while. Therefore, when the block BLK with the oldest time of transition to the active block is selected as the transcription source block BLK in the garbage collection, the cold data may be combined into several block BLKs. Combining the cold data into several block BLKs improves the utilization efficiency of all block BLKs, which may improve the efficiency of the garbage collection in the future.

In the normal mode, a block BLK with the oldest time when data is last written does not necessarily have to be selected as a transcription source block BLK in the garbage collection.

For example, in the normal mode, the controller 100 may preferentially select the block BLK having the older time when data is written, as the transcription source block BLK in the garbage collection.

Alternatively, in the normal mode, the controller 100 may select a transcription source block BLK in the garbage collection based on a complicated determination in which any condition is added to the condition regarding the time when the data is last written. For example, the controller 100 may select a block BLK having the amount of stored valid data as small as possible among several block BLKs with the old time when data is last written, as the transcription source block BLK in the garbage collection.

Figure 11:
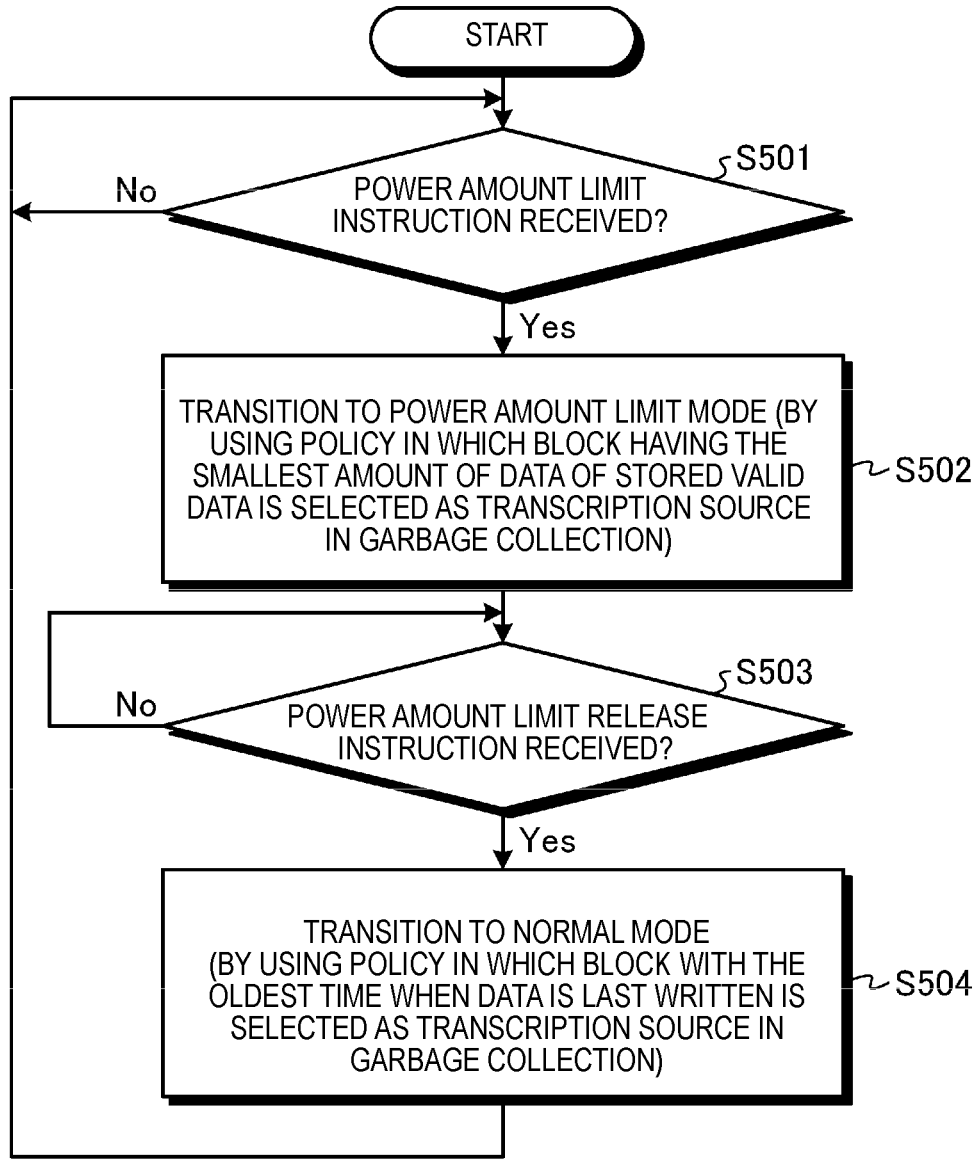
FIG. 11 is a flowchart illustrating an example of an operation related to the transition of an operation mode of the second embodiment.

FIG. 11 is a flowchart illustrating an example of an operation related to the transition of the operation mode of the second embodiment.

In the description of FIG. 11, in the power amount limit mode, as an example, it is assumed that the controller 100 selects a block BLK having the smallest amount of stored valid data as a transcription source block BLK in the garbage collection. Further, in the normal mode, as an example, it is assumed that the controller 100 selects a block BLK with the oldest time when data is last written, as a transcription source block BLK in the garbage collection. Further, it is assumed that the operation mode of the memory system 1 is the normal mode in an initial state of FIG. 11.

The controller 100 (e.g., the processor 101) determines whether or not the memory system 1 has received a power amount limit instruction from the host device 2 (S501). When it is determined that the memory system 1 has not received the power amount limit instruction (No in S501), the controller 100 executes the determination process of S501 again.

When it is determined that the memory system 1 has received the power amount limit instruction (Yes in S501), the controller 100 transitions to the power amount limit mode (S502). In the power amount limit mode, the controller 100 uses a policy for selecting a block BLK having the smallest amount of stored valid data, as a transcription source in the garbage collection.

After S502, the controller 100 determines whether or not a power amount limit release instruction has been received from the host device 2 (S503). When it is determined that the power amount limit release instruction has not been received (No in S503), the controller 100 executes the determination process of S503 again.

When it is determined that the power amount limit release instruction has been received (Yes in S503), the controller 100 transitions to the normal mode (S504). In the normal mode, the controller 100 uses a policy for selecting a block BLK with the oldest time when data is last written, as a transcription source in the garbage collection.

Then, the control proceeds to S501.

In this way, in the second embodiment, the controller 100 selects the transcription source block BLK in the garbage collection according to a policy based only on the amount of stored valid data in the power amount limit mode. Further, in the normal mode, the controller 100 selects the transcription source block BLK in the garbage collection according to a policy different from the policy in the power amount limit mode.

More specifically, in the power amount limit mode, the controller 100 preferentially selects the block BLK having a smaller amount of stored valid data, as the transcription source block.

Accordingly, in the power amount limit mode, the amount of data moved to generate one free block may be reduced, so that the amount of power required for the garbage collection may be reduced. As a result, the amount of power consumption of the memory system 1 may be reduced in the power amount limit mode.

Further, in the normal mode, the controller 100 may select the transcription source block BLK in the garbage collection based on the time when data is last written.

In such a case, for example, cold data may be combined into several blocks BLK, so the efficiency of garbage collection will improve in the future. As described above, the policy for selecting the transcription source block BLK in the normal mode is not limited to this example.

Third Embodiment

In a third embodiment, the controller 100 generates a plan related to the amount of power consumption (referred to as a power consumption amount plan) based on an instruction from the host device 2. Then, the controller 100 executes switching the operation mode of the memory system 1 between the power amount limit mode and the normal mode so that the amount of power consumption satisfies the power consumption amount plan.

Hereinafter, the third embodiment will be described. In the third embodiment, points different from the first embodiment will be described, and the same points as those in the first embodiment will be omitted or briefly described.

Specifically, the controller 100 may receive a scheduled power consumption amount and a planned period in addition to the power amount limit instruction from the host device 2. The scheduled power consumption amount received by the memory system 1 from the host device 2 is an example of a first value. The planned period received by the memory system 1 from the host device 2 is an example of a second value.

The planned period defines a period during which operation may be performed in the power amount limit mode. For example, when the planned period is "30 minutes," the switching of the operation mode of the memory system 1 between the power amount limit mode and the normal mode is executed based on the power consumption amount plan until 30 minutes elapse from the start time of the planned period.

The planned period received from the host device 2 may be numerical information directly indicating the length of the planned period. The planned period received from the host device 2 may be a pair of numerical information indicating the start time of the planned period and numerical information indicating the end time of the planned period. The planned period received from the host device 2 may be numerical information indicating the end time. When the planned period received from the host device 2 is the numerical information indicating the end time, a method of specifying the start time of the planned period is freely chosen. For example, the controller 100 may be configured so as to interpret a power amount limit instruction as an instruction to start the planned period.

Alternatively, a plurality of numerical information may be set in advance in the controller 100, and each of the plurality of numerical information may be numerical information that may be set as the planned period and may be associated with an identifier. Then, the host device 2 may select the numerical information to be set as the planned period from the plurality of numerical information by transmitting the identifier.

The scheduled power consumption amount defines the amount of power that may be consumed within the planned period.

The scheduled power consumption amount received from the host device 2 may be numerical information directly indicating the scheduled power consumption amount.

Alternatively, a plurality of numerical information may be set in advance in the controller 100, and each of the plurality of numerical information may be numerical information that may be set as the scheduled power consumption amount and may be associated with an identifier. Then, the host device 2 may select the numerical information to be set as the scheduled power consumption amount from the plurality of numerical information by transmitting the identifier.

The controller 100 creates the power consumption amount plan based on the scheduled power consumption amount and the planned period.

Figure 12:
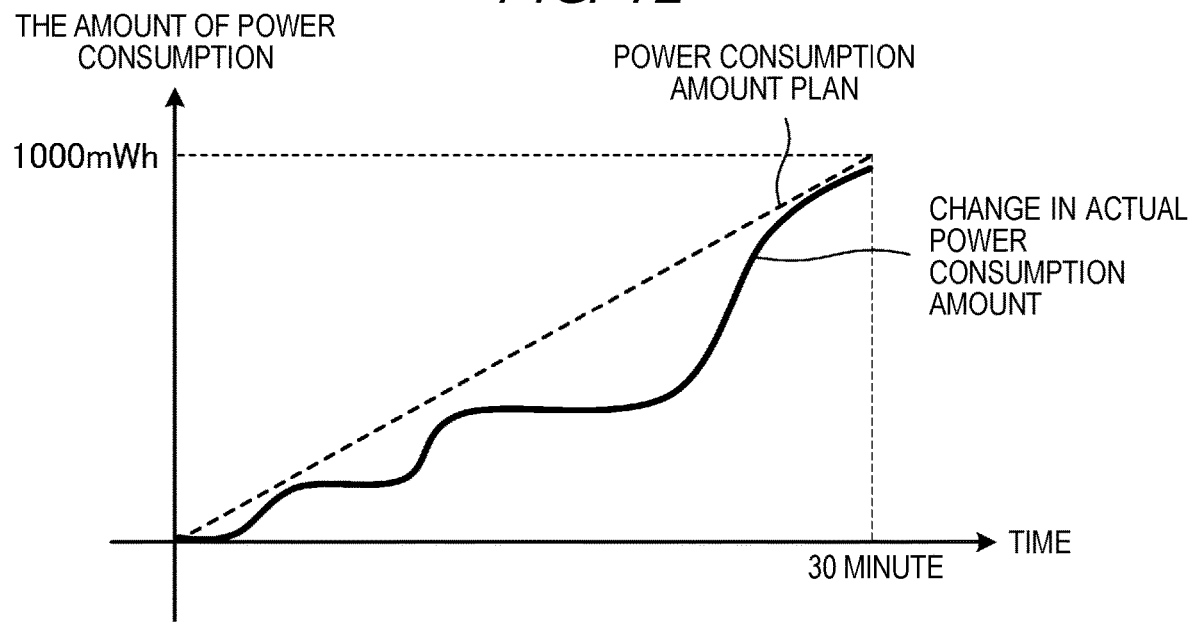
FIG. 12 is a schematic diagram illustrating an example of a power consumption amount plan generated by a controller of a third embodiment.

FIG. 12 is a schematic diagram illustrating an example of the power consumption amount plan generated by the controller 100 of the third embodiment. The horizontal axis represents the elapsed time after the start of the planned period. The vertical axis represents the amount of power consumption after the start of the planned period. In the example of FIG. 12, it is assumed that the scheduled power consumption amount is 1,000 mWh and the planned period is 30 minutes.

A dotted line represents the power consumption amount plan. In this example, the power consumption amount plan is generated so that the amount of power consumption increases linearly with time from 0 mWh to 1,000 mWh. Then, at the end of the planned period, that is, at the timing when 30 minutes elapsed after the start of the planned period, the gradient of the amount of power consumption is determined so that the amount of power consumption after the start of the planned period becomes 1,000 mWh.

The controller 100 starts controlling the amount of power amount based on the power consumption amount plan according to a power amount limit instruction. More specifically, the controller 100 controls the amount of power consumption of the memory system 1 so that the actual amount of power consumption does not exceed a value indicated by the power consumption amount plan as much as possible by transitioning the operation mode of the memory system 1 to the power amount limit mode as necessary. That is, the power consumption amount plan defines a change in the upper limit value of the amount of power consumption.

The controller 100 may reduce the amount of power consumption of the memory system 1 so as not to exceed the scheduled power consumption amount in the planned period by executing the switching of the operation mode so that the amount of power consumption does not exceed the upper limit value defined by the power consumption amount plan.

FIG. 12 illustrates an example (see a solid line) of the change in the actual amount of power consumption in the memory system 1. It may be found that the actual amount of power consumption is controlled so as not to exceed the upper limit value defined by the power consumption amount plan, by the above-described control.

Figure 13:
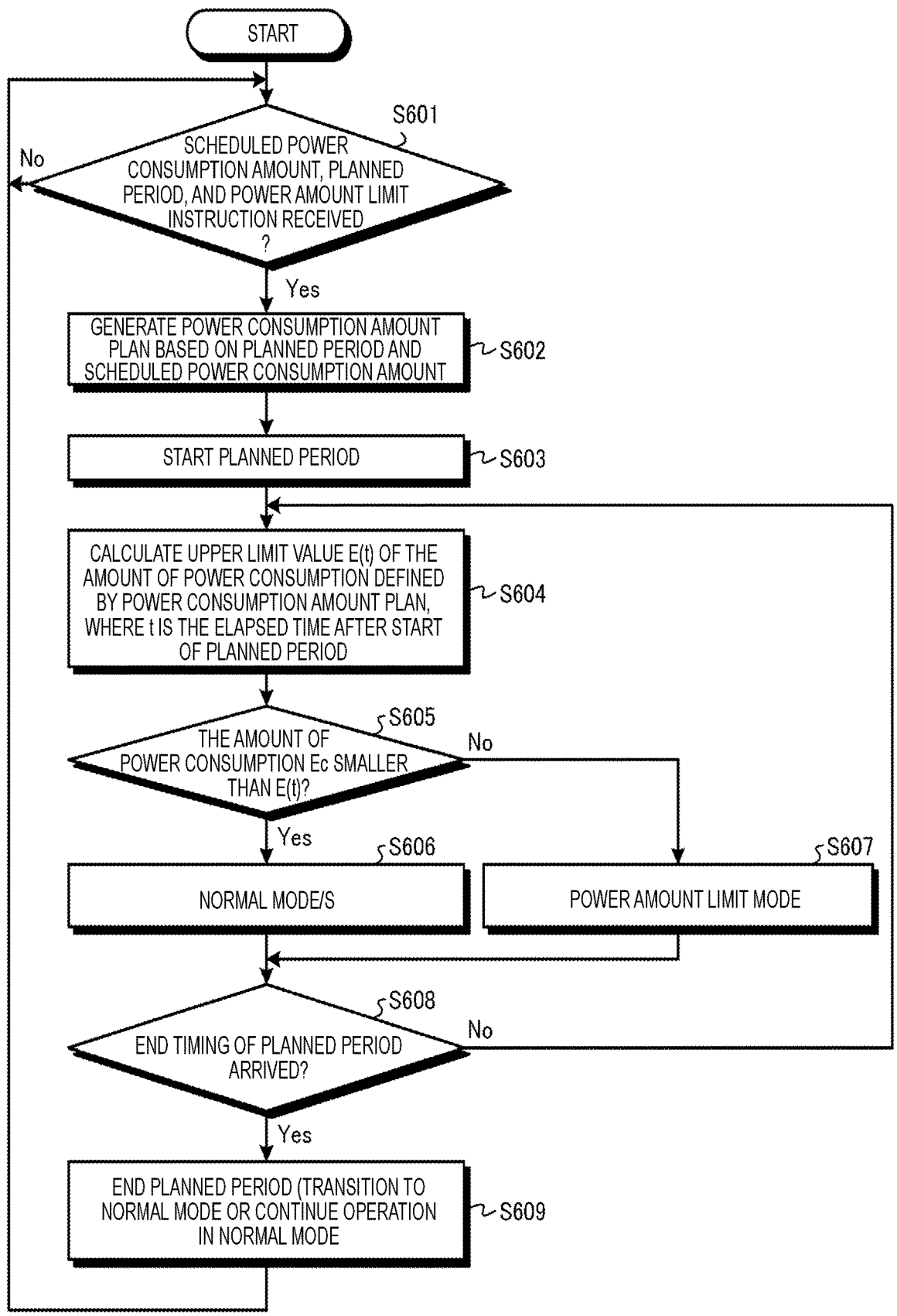
FIG. 13 is a flowchart illustrating an example of an operation related to the transition of an operation mode of the third embodiment.

FIG. 13 is a flowchart illustrating an example of an operation related to the transition of the operation mode of the third embodiment.

The controller 100 determines whether or not the memory system 1 has received a scheduled power consumption amount, a planned period, and a power amount limit instruction from the host device 2 (S601).

When it is determined that the memory system 1 has not received the scheduled power consumption amount, the planned period, and the power amount limit instruction from the host device 2 (No in S601), the controller 100 executes the process of S601 again.

When it is determined that the memory system 1 has received the scheduled power consumption amount, the planned period, and the power amount limit instruction from the host device 2 (Yes in S601), the controller 100 generate a power consumption amount plan based on the scheduled power consumption amount and the planned period (S602).

Subsequently, the controller 100 starts controlling the amount of power consumption according to the already received power amount limit instruction. That is, the controller 100 starts the planned period (S603).

In the planned period, the controller 100 determines an operation mode based on a comparison between the amount of power consumption after the start of the planned period and the upper limit value defined by the power consumption amount plan.

More specifically, the controller 100 calculates an upper limit value E(t) of the amount of power consumption defined by the power consumption amount plan at the point of time when the elapsed time (referred to as time t) from the start of the planned period to the present has elapsed (S604).

E(t) is calculated using, for example, the following formula (1). Here, as an example, it is assumed that the power consumption amount plan is generated by the method described with reference to FIG. 12.

$$E(t)=Ep*t/tp \quad (1)$$

Where, Ep is the scheduled power consumption amount, and tp is the length of the planned period. In the formula (1), t is set to have a value of 0 or more and tp or less.

Subsequently, the controller 100 determines whether or not the amount of power consumption (denoted as Ec) after the start of the planned period is less than E(t) (S605).

When it is determined that Ec is less than E(t) (Yes in S605), the controller 100 operates in the normal mode (S606). When it is determined that Ec is not less than E(t) (No in S605), the controller 100 operates in the power amount limit mode (S607).

After S606 or S607, the controller 100 determines whether or not the end timing of the planned period has arrived (S608). When it is determined that the end timing of the planned period has not arrived (No in S608), the controller 100 executes the process of S604 again. When it is determined that the end timing of the planned period has arrived (Yes in S608), the controller 100 ends the planned period (S609). That is, when the operation mode of the controller 100 is the power amount limit mode, the controller 100 transitions to the normal mode. When the operation mode of the controller 100 is the normal mode, the controller 100 continues the operation in the normal mode. A series of operations is completed by S609.

The operation in the normal mode of the controller 100 of the third embodiment may be the same as the operation in the normal mode of the controller 100 of the first embodiment or the operation in the normal mode of the controller 100 of the second embodiment.

The operation in the power amount limit mode of the controller 100 of the third embodiment may be the same as the operation in the power amount limit mode of the controller 100 of the first embodiment or the operation in the power amount limit mode of the controller 100 of the second embodiment.

The loop process from S604 to S608 is repeated at a sufficiently short time interval with respect to the planned period. Accordingly, by repeating the loop process, the switching of the operation mode is executed so that the amount of power consumption does not exceed the value defined as the power consumption amount plan as much as possible. As a result, the amount of power consumption is reduced so that the amount of power consumption in the planned period does not exceed the scheduled power consumption amount.

In the above, it has been described that the controller 100 operates in the power amount limit mode when Ec is equal to E(t). The process when Ec is equal to E(t) is not limited thereto. When Ec is equal to E(t), the controller 100 may operate in normal mode.

Further, a method in which the controller 100 acquires its own power consumption amount is not limited to a specific method.

Figure 14:
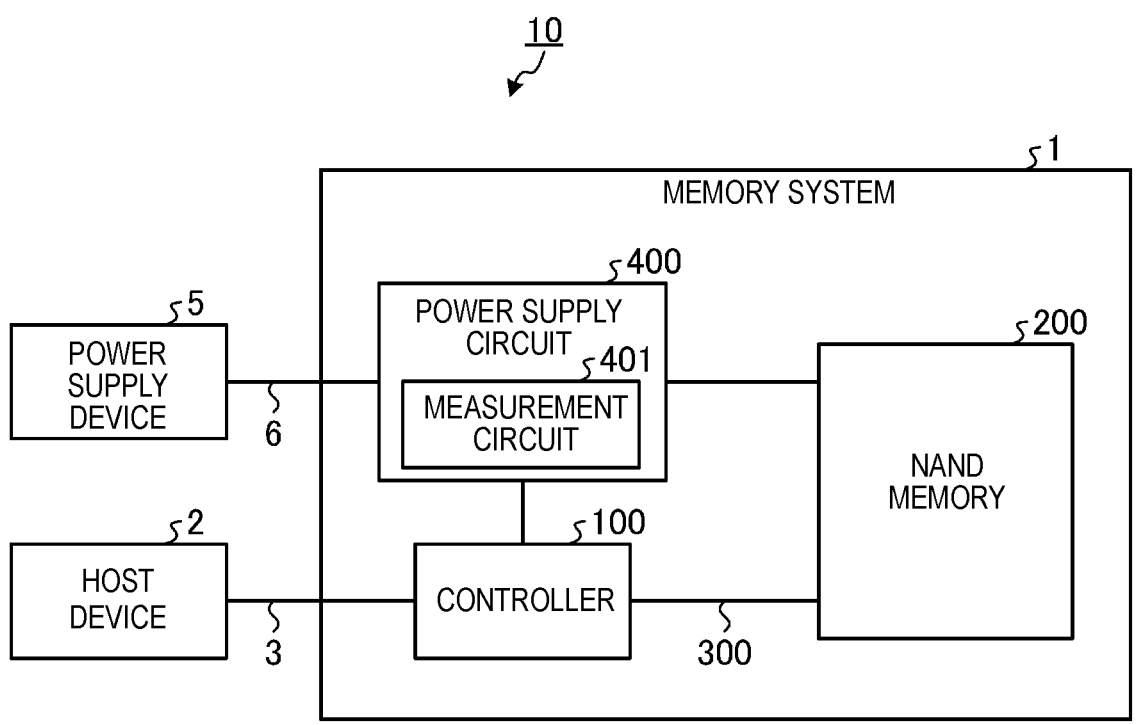
FIG. 14 is a schematic diagram illustrating an example of the configuration of a memory system of the third embodiment.

In one example, it is conceivable to provide a circuit for monitoring the power consumption for the memory system 1. FIG. 14 is a schematic diagram illustrating an example of the configuration of the memory system 1 of the third embodiment. In FIG. 14, the same configuration as that in the first embodiment is not illustrated.

As illustrated in FIG. 14, the information processing system 10 includes a power supply device 5. The memory system 1 includes a power supply circuit 400 in addition to the controller 100 and the NAND memory 200. The power supply circuit 400 is connected to the power supply device 5 by a power supply line 6. The power supply circuit 400 generates power for operating the controller 100 and the NAND memory 200 based on power supplied from the power supply device 5 via the power supply line 6 and supplies the generated power to the controller 100 and the NAND memory 200.

The power supply circuit 400 includes a measurement circuit 401. The measurement circuit 401 measures the power consumption of the memory system 1. The measurement result by the measurement circuit 401 is transmitted to the controller 100. The controller 100 calculates the amount of power consumption based on the obtained measurement result.

The measurement circuit 401 may be provided on a board (not illustrated) of the memory system 1. In such a case, the measurement circuit 401 measures, for example, the amount of current flowing through the board. The measurement result by the measurement circuit 401 is transmitted to the controller 100. The controller 100 calculates the amount of power consumption based on the obtained measurement result and the rated voltage.

In another example, parameters such as the amount of power consumed per write in the NAND memory 200, the amount of power consumed per read from the NAND memory 200, the amount of power consumed per data transfer of unit size data in the communication interface 3, the amount of power consumed by each component in the steady state, and the like are stored in advance at a predetermined position (e.g., the NAND memory 200). Then, the controller 100 calculates the amount of power consumption in the memory system 1 based on these parameters, the number of reads actually executed by each memory chip

201, the number of writes actually executed by each memory chip 201, the amount of data transferred via the communication interface 3, and the like.

In yet another example, the memory system 1 may be configured such that information regarding the power consumption of the memory system 1 is input from the host device 2.

Figure 15:
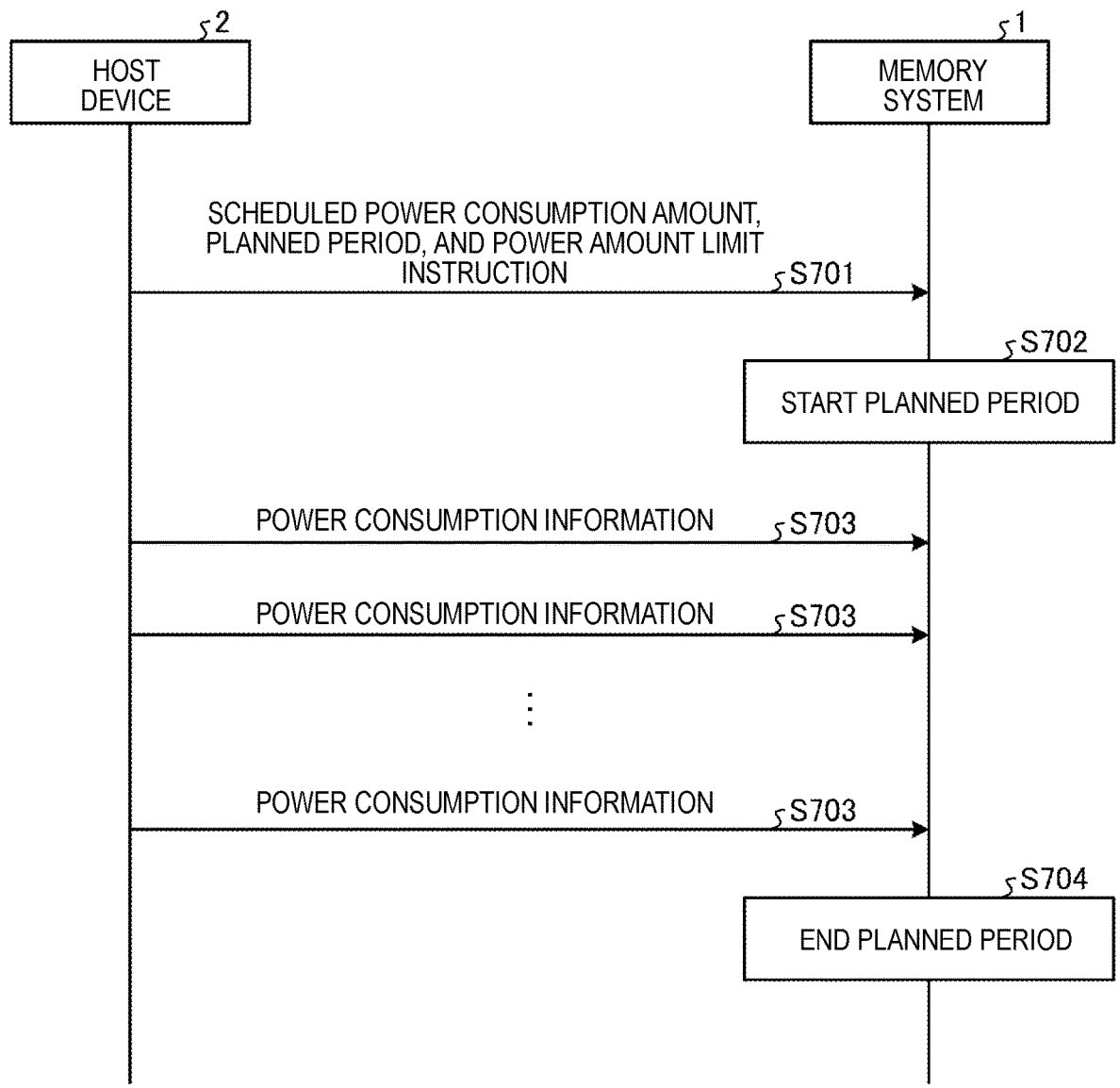
FIG. 15 is a diagram illustrating an example of a method in which the memory system of the third embodiment receives information regarding power consumption.

FIG. 15 is a diagram illustrating an example of a method in which the memory system 1 of the third embodiment receives the information regarding the power consumption.

As illustrated in FIG. 15, the host device 2 first transmits the scheduled power consumption amount, the planned period, and the power amount limit instruction (S701). Then, in the memory system 1, the controller 100 starts the planned period (S702). In the planned period, the host device 2 transmits power consumption information to the memory system 1 while data transmission/reception is executed between the host device 2 and the memory system 1 (S703).

The power consumption information may be the power consumption of the memory system 1 at the timing when the power consumption information is transmitted. The power consumption information may be the amount of power consumed in the memory system 1 after a predetermined timing. The predetermined timing may be, for example, the start timing of the planned period, the timing at which the power consumption information is transmitted previously, or other timings. The power consumption information may be the amount of current flowing through the memory system 1. That is, the power consumption information is any physical quantity related to the power consumption that the memory system 1 may use for calculating the amount of power consumption.

The power consumption information may be transmitted by using any command. For example, one vendor-specific command may be assigned as a command for transmitting the power consumption information. The command for transmitting the power consumption information may be incorporated in the standard of the communication interface 3. The host device 2 and the memory system 1 are connected by a dedicated signal line for transferring the power consumption information, and the host device 2 may transmit the power consumption information to the memory system 1 via the dedicated signal line.

The transmission of the power consumption information from the host device 2 to the memory system 1 is executed once or more periodically or at any timing. The controller 100 may calculate the amount of power consumption based on the power consumption information received from the host device 2.

When the planned period ends (S704), the host device 2 may end the transmission of the power consumption information.

In addition, the host device 2 may transmit the power consumption information in a period other than the planned period. Further, the memory system 1 may transmit a request for the power consumption information to the host device 2, and the host device 2 may transmit the power consumption information according to the request. A method for the host device 2 to transmit the power consumption information to the memory system 1 may be changed in various ways.

In addition, the host device 2 does not have to collectively transmit the scheduled power consumption amount, the planned period, and the power amount limit instruction. The memory system 1 may be configured to be able to receive the scheduled power consumption amount, the planned period, or both at a timing different from the timing for the power amount limit instruction.

For example, the memory system 1 receives the scheduled power consumption amount and the planned period from the host device 2. After that, when receiving the power amount limit instruction, the memory system 1 may start the planned period according to the power amount limit instruction.

In the above, as an example of the power consumption amount plan, the power consumption amount plan indicated by the dotted line in FIG. 12 has been described. The power consumption amount plan is not limited to the example illustrated in FIG. 12. Further, the memory system 1 may be configured so that the power consumption amount plan may be changed during the planned period. For example, the controller 100 may newly generate a power consumption amount plan in which the upper limit value of the amount of power consumption increases linearly with time from the already consumed amount of power consumption to the scheduled power consumption amount, at any timing during the planned period, and may start an operation based on the newly generated power consumption amount plan. That is, the controller 100 may regenerate the power consumption amount plan during the planned period. The controller 100 may regenerate the power consumption amount plan at a plurality of different timings during the planned period. The host device 2 may instruct the memory system 1 for a timing at which the power consumption amount plan is regenerated.

Further, the host device 2 may instruct to change the power consumption amount plan as appropriate during the planned period.

Further, when it is expected that the power consumption increases in the first half of the planned period due to the concentration of read or write in the first half of the planned period, the controller 100 may have a margin in the upper limit value of the amount of power consumption in the first half of the planned period.

Figure 16A:
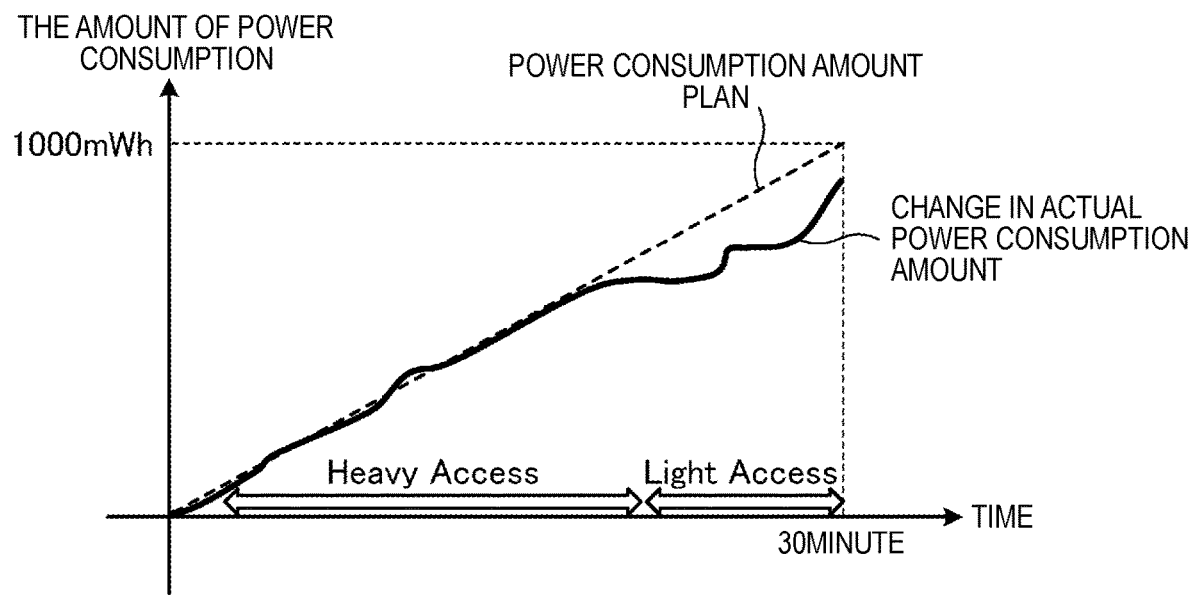
FIGS. 16A and 16B are diagrams illustrating an example of a change in the power consumption amount plan according to the third embodiment.
Figure 16B:
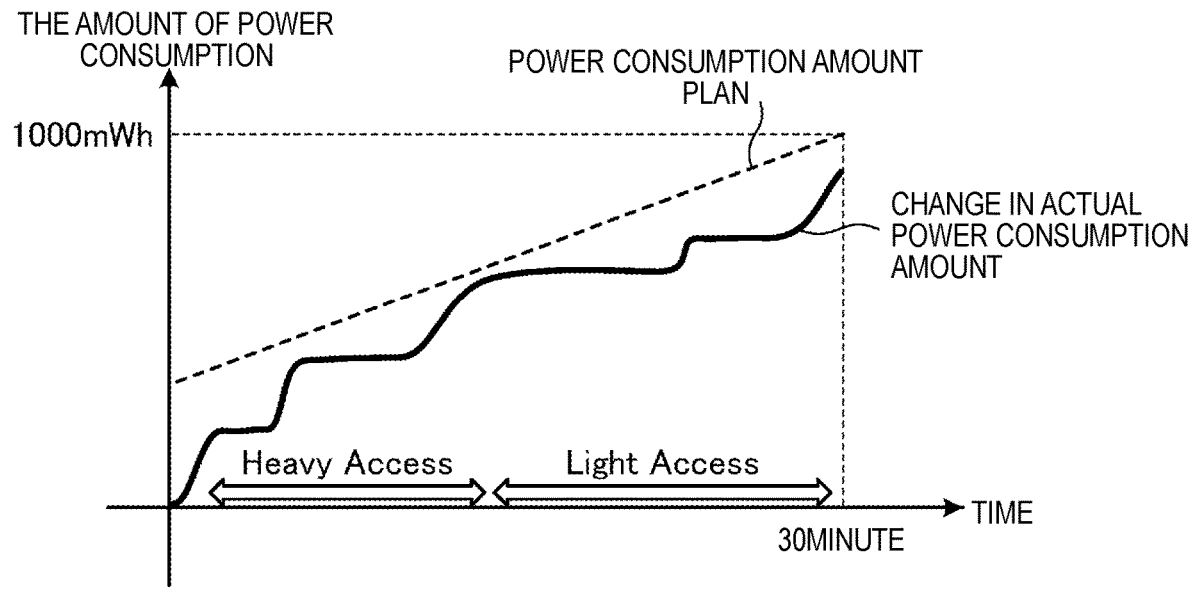

FIGS. 16A and 16B are diagrams illustrating an example of the power consumption amount plan according to the third embodiment. For example, as illustrated in FIG. 16A, the actual amount of power consumption may be close to or exceed the upper limit value defined by the initially generated power consumption amount plan due to the heavy access amount from the host device 2 in the first half of the planned period. In such a case, the upper limit value defined by the power consumption amount plan becomes a bottleneck, which reduces the performance of access between the host device 2 and the memory system 1.

Therefore, as indicated by the dotted line in FIG. 16B, the controller 100 changes the power consumption amount plan to a linear function having a positive value as an intercept. As a result, as indicated by a solid line in FIG. 16B, even when the power consumption increases in the first half of the planned period due to the heavy access amount from the host device 2, it is prevented that the amount of power consumption is reduced by the upper limit value. That is, it is prevented that the performance of access between the host device 2 and the memory system 1 is reduced in the first half of the planned period.

A trigger for changing the power consumption amount plan is optional. The host device 2 may transmit an instruction to use a function having a margin in the upper limit value of the amount of power consumption in the first half of the planned period, and the controller 100 may change the power consumption amount plan according to the instruction. Alternatively, when detecting that the actual amount of power consumption is close to or exceeds the upper limit value defined by the initially generated power consumption amount plan, the controller 100 may autonomously change the power consumption amount plan.

Further, the controller 100 may not change the power consumption amount plan by generating the power consumption amount plan as indicated by the dotted line in FIG. 16B at the start of the planned period.

Further, the function of the power consumption amount plan illustrated in FIG. 16B is an example of a function for giving a margin to the upper limit value of the amount of power consumption in the first half of the planned period. A power function may be adopted as the function for giving a margin in the upper limit value of the amount of power consumption in the first half of the planned period.

In this way, according to the third embodiment, the controller 100 receives the scheduled power consumption amount and the planned period from the host device 2. Then, the controller 100 controls the amount of power consumption of the memory system 1 so that the amount of power consumption in the planned period does not exceed the scheduled power consumption amount according to the power amount limit instruction.

Accordingly, it is possible for the host device 2 to operate the memory system 1 with a limited amount of power for a limited period of time.

For example, the information processing system 10 may be a portable computer including the memory system 1, a volatile memory, and a battery. The host device 2 is driven by power stored in the battery and, when the remaining amount of power of the battery becomes insufficient, saves the contents of the volatile memory in a nonvolatile memory, that is, in this case, the memory system 1, by using the remaining amount of power. This operation is called PLP (Power Loss Protection). In the PLP, since the remaining amount of power of the battery is insufficient, it is desired to reduce the amount of power consumption of the memory system 1 to the amount of power corresponding to the remaining amount of power of the battery.

The memory system 1 according to the third embodiment may operate so that the amount of power consumption does not exceed the scheduled power consumption amount in the planned period. Accordingly, when the host device 2 determines the scheduled power consumption amount and the planned period based on the remaining amount of power of the battery and transmits the scheduled power consumption amount and the planned period to the memory system 1 together with the power amount limit instruction, it is possible to implement the operation of PLP by using the insufficient amount of power.

Further, according to the third embodiment, the controller 100 generates the power consumption amount plan that defines the change in the upper limit value of the amount of power consumption based on the scheduled power consumption amount and the planned period, and reduces the amount of power consumption of the memory system 1 based on the power consumption amount plan according to the power amount limit instruction.

Accordingly, it is possible to control the amount of power consumption of the memory system 1 so that the amount of power consumption in the planned period does not exceed the scheduled power consumption amount.

Further, according to the third embodiment, it is possible for the controller 100 to operate in the normal mode and the power amount limit mode having the less amount of power consumption than that in the normal mode. Then, the controller 100 executes the switching between the normal mode and the power amount limit mode based on the power consumption amount plan.

Accordingly, it is possible to control the amount of power consumption of the memory system 1 so that the amount of power consumption in the planned period does not exceed the scheduled power consumption amount.

Further, according to the third embodiment, as an example, the controller 100 may be configured to be able to receive the power consumption amount information from the host device 2 and acquire the amount of power consumption of the memory system 1 based on the power consumption amount information.

In such a case, it is not necessary to provide the memory system 1 with a circuit for measuring the physical quantity related to the amount of power consumption.

The condition for ending the planned period is not limited to the elapse of the time designated as the second value from the host device 2. For example, the controller 100 may end the planned period when it receives the power amount limit release instruction during the planned period.

Fourth Embodiment

In the power consumption amount plan according to the third embodiment, the change in the upper limit value of the amount of power consumption is defined as the function of time. In a power consumption amount plan according to a fourth embodiment, the change in the upper limit value of the amount of power consumption is defined as a function of amount of data transferred from the host device 2 to the NAND memory 200. The amount of data transferred from the host device 2 to the NAND memory 200 will be referred to as a host write amount.

Hereinafter, points different from the third embodiment will be described. The same points as in the third embodiment will be omitted or briefly described.

In the fourth embodiment, the memory system 1 may receive a scheduled power consumption amount and a scheduled host write amount from the host device 2. The scheduled host write amount is another example of the second value. The controller 100 generates a power consumption amount plan based on the scheduled power consumption amount and the scheduled host write amount.

FIG. 17 is a schematic diagram illustrating an example of the power consumption amount plan generated by the controller 100 of the fourth embodiment. In FIG. 17, the horizontal axis represents the host write amount after the start of the planned period. The vertical axis represents the amount of power consumption after the start of the planned period. In the example of FIG. 17, the scheduled power consumption amount is 1,000 mWh, and the scheduled host write amount is 50 GB.

A dotted line indicates the power consumption amount plan. In this example, the power consumption amount plan is generated so that the amount of power consumption increases linearly with respect to the host write amount from 0 mWh to 1,000 mWh. Then, at the end of the planned period, that is, at the timing when the host write amount after the start of the planned period reaches 50 GB, the gradient of amount of power consumption is determined so that the amount of power consumption after the start of the planned period becomes 1,000 mWh.

The controller 100 starts controlling the amount of power consumption based on the power consumption amount plan according to a power amount limit instruction. More specifically, the controller 100 controls the amount of power consumption of the memory system 1 so that the actual amount of power consumption does not exceed the upper limit value defined by the power consumption amount plan as much as possible by transitioning the operation mode of the memory system 1 to the power amount limit mode as necessary.

FIG. 17 illustrates an example (see a solid line) of the actual amount of power consumption in the memory system 1. It may be found that the change in the actual amount of power consumption is controlled so as not to exceed the change in the upper limit value defined by the power consumption amount plan by the above-described control.

Figure 18:
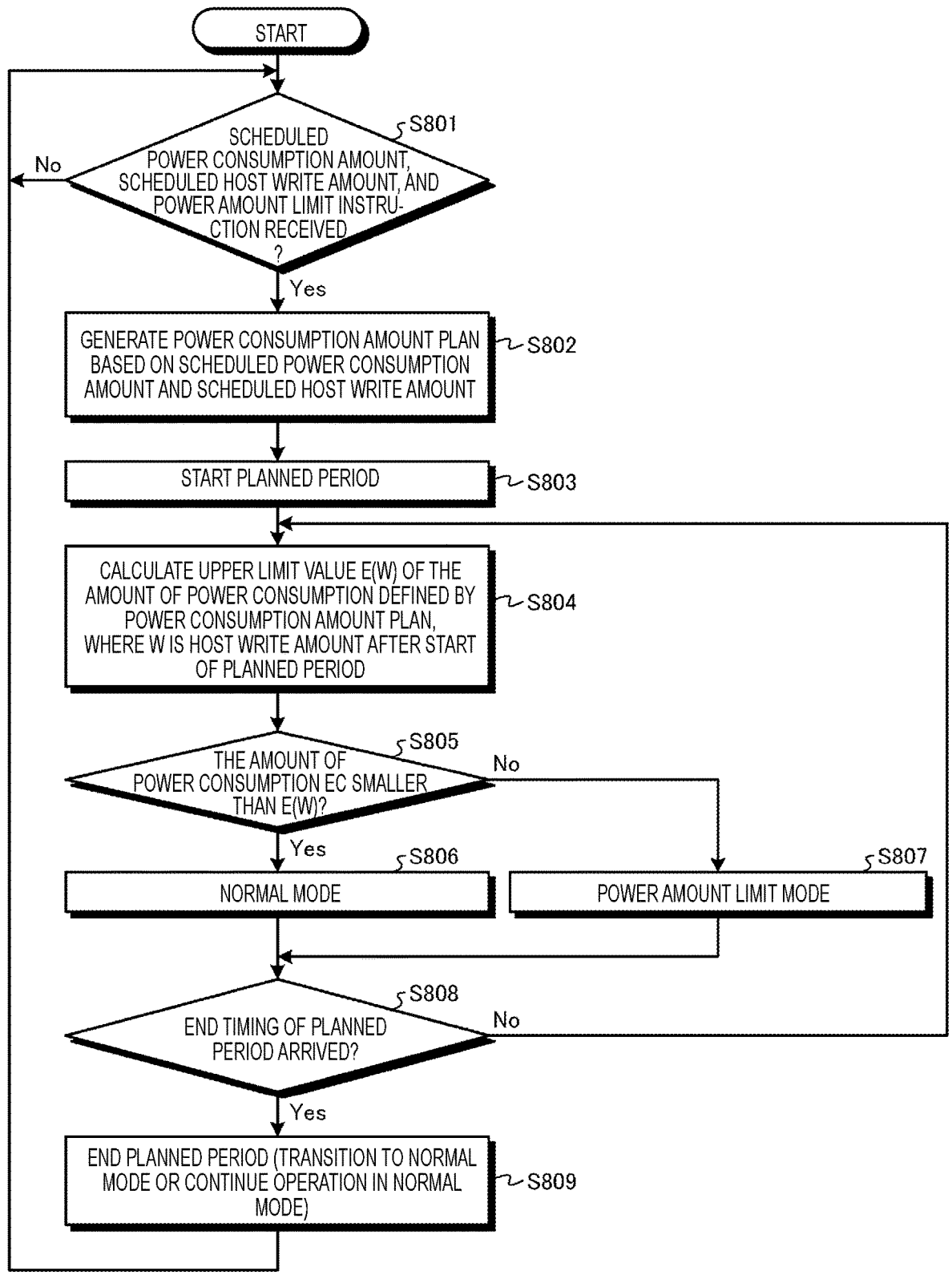
FIG. 18 is a flowchart illustrating an example of an operation related to the transition of an operation mode of the fourth embodiment.

FIG. 18 is a flowchart illustrating an example of an operation related to the transition of the operation mode of the fourth embodiment.

The controller 100 determines whether or not the memory system 1 has received a scheduled power consumption amount, a scheduled host write amount, and a power amount limit instruction from the host device 2 (S801).

When it is determined that the memory system 1 has not received the scheduled power consumption amount, the scheduled host write amount, and the power amount limit instruction from the host device 2 (No in S801), the controller 100 executes the process of S801 again.

When it is determined that the memory system 1 has received the scheduled power consumption amount, the scheduled host write amount, and the power amount limit instruction from the host device 2 (Yes in S801), the controller 100 generates a power consumption amount plan based on the scheduled power consumption amount and the scheduled host write amount (S802).

Subsequently, the controller 100 starts controlling the amount of power according to the already received power amount limit instruction. That is, the planned period is started (S803).

In the planned period, the controller 100 determines an operation mode based on a comparison between the amount of power consumption after the start of the planned period and the power consumption amount plan.

More specifically, the controller 100 first calculates an upper limit value E(W) of the amount of power consumption defined by the power consumption amount plan (S804).

E(W) is calculated using, for example, the following formula (2). Here, as an example, it is assumed that the power consumption amount plan is generated by the method described with reference to FIG. 17.

$$E(W)=Ep*W/Wp \qquad (2)$$

Where, W is the host write amount from the start of the planned period to the present. Ep is the scheduled power consumption amount and Wp is the scheduled host write amount. In the formula (2), it is assumed that W has a value of 0 or more and Wp or less.

Subsequently, the controller 100 determines whether or not the amount of power consumption Ec from the start of the planned period to the present is smaller than E(W) (S805). A method of acquiring Ec is not limited to a specific method. Ec is acquired in the same manner as in the third embodiment.

When it is determined that Ec is smaller than E(W) (Yes in S805), the controller 100 operates in the normal mode (S806). When it is determined that Ec is not smaller than E(W) (No in S805), the controller 100 operates in the power amount limit mode (S807).

After S806 or S807, the controller 100 determines whether W has reached Wp (S808). When it is determined that W has not reached Wp (No in S808), the controller 100 executes the process of S804 again. When it is determined that W has reached Wp (Yes in S808), the controller 100 ends the planned period (S809). That is, when the operation mode of the controller 100 is the power amount limit mode, the controller 100 transitions to the normal mode. When the operation mode of the controller 100 is the normal mode, the controller 100 continues the operation in the normal mode. A series of operations is completed by S809.

The operation in the normal mode of the controller 100 of the fourth embodiment may be the same as the operation in the normal mode of the controller 100 of the first embodiment or the operation in the normal mode of the controller 100 of the second embodiment.

The operation in the power amount limit mode of the controller 100 of the fourth embodiment may be the same as the operation in the power amount limit mode of the controller 100 of the first embodiment or the operation in the power amount limit mode of the controller 100 of the second embodiment.

The loop process from S804 to S808 is repeated, for example, at a predetermined time interval. The predetermined time interval is sufficiently shorter than the length of the planned period. Accordingly, by repeating the loop process from S804 to S808, the switching of the operation mode is executed so that the amount of power consumption does not exceed the upper limit value set as the power consumption amount plan as much as possible. As a result, it is possible to execute write of the amount of data set as the scheduled host write amount while reducing the amount of power consumption so that the amount of power consumption does not exceed the scheduled power consumption amount.

In the above, it has been described that the controller 100 operates in the power amount limit mode when Ec is equal to E(W). The process when Ec is equal to E(W) is not limited thereto. When Ec is equal to E(W), the controller 100 may operate in the normal mode.

Further, the power consumption amount plan is not limited to the example illustrated in FIG. 17. Any function may be adopted as the function representing the power consumption amount plan.

Further, the memory system 1 may be configured so that the power consumption amount plan may be changed during the planned period. For example, the controller 100 may regenerate the power consumption amount plan so that the upper limit value of the amount of power consumption increases linearly with respect to the host write amount from the amount of power consumption already consumed during the planned period to the scheduled power consumption amount.

Further, the host device 2 may instruct to change the power consumption amount plan as appropriate during the planned period.

Further, when receiving a power amount limit release instruction during the planned period, the controller 100 may end the planned period according to the power amount limit release instruction.

Further, the host device 2 may not collectively transmit the scheduled power consumption amount, the scheduled host write amount, and the power amount limit instruction. The memory system 1 may be configured to be able to receive the scheduled power consumption amount, the scheduled host write amount, or both at a timing different from the timing for the power amount limit instruction.

In this way, according to the fourth embodiment, the controller 100 receives the scheduled power consumption amount and the scheduled host write amount from the host device 2. Then, the controller 100 transfers the amount of data designated as the scheduled host write amount so that the amount of power consumption does not exceed the scheduled power consumption amount.

Accordingly, it is possible for the host device 2 to transfer a limited amount of data for a limited period of time.

The technique of the fourth embodiment may be useful for PLP as in the third embodiment. For example, when the host device 2 determines the scheduled power consumption amount and the scheduled host write amount based on the remaining power amount of a battery and transmits the scheduled power consumption amount and the scheduled host write amount to the memory system 1 together with the power amount limit instruction, it is possible to implement the operation of PLP using an insufficient amount of power.

In the above-described example, the memory system 1 is configured to be able to control the amount of power consumption based on the host write amount. The memory system 1 may be configured to be able to control the amount of power consumption based on the amount of data transferred from the NAND memory 200 to the host device 2 (referred to as a host read amount).

For example, the memory system 1 may receive the scheduled power consumption amount and a scheduled host read amount from the host device 2. The controller 100 may generate a power consumption amount plan in which the upper limit value of the amount of power consumption is defined as a function of host read amount, based on the scheduled power consumption amount and the scheduled host read amount, and may control the amount of power consumption based on the host read amount and the power consumption amount plan.

Alternatively, the memory system 1 may control the amount of power consumption based on both the host write amount and the host read amount. The controller 100 may generate a power consumption amount plan in which the upper limit value of the amount of power consumption is defined as a function of host read amount and host write amount, based on the scheduled power consumption amount, the scheduled host read amount, and the scheduled host write amount, and may control the amount of power consumption based on the host read amount, the host write amount, and the power consumption amount plan.

Hereinafter, the host write amount, the host read amount, or both may be collectively referred to as a host access amount.

Fifth Embodiment

In the third and fourth embodiments, when the amount of power consumption is smaller than the upper limit value defined by the power consumption amount plan, the controller 100 sets the operation mode of the memory system 1 as the normal mode. In a fifth embodiment, when the amount of power consumption is significantly smaller than the upper limit value, the controller 100 sets the operation mode of the memory system 1 to a mode in which the processing amount of the transcription process is increased as compared with the normal mode. That is, the controller 100 increases the processing amount of the transcription process by utilizing the abundant amount of power that may be used. The mode in which the processing amount of the transcription process is increased compared to the normal mode will be referred to as a high power mode.

A method of increasing the processing amount of the transcription process is not limited to a specific method. For example, the controller 100 may set the execution frequency of the transcription process in the high power mode to be higher than the execution frequency of the transcription process in the normal mode.

Alternatively, the controller 100 sets the start condition of the transcription process to be different between the high power mode and the normal mode. For example, when it is the start condition of the garbage collection (or the eviction) that the number of free blocks is lower than the determination threshold value, different values are used as the determination threshold values in the high power mode and the normal mode. Specifically, the controller 100 uses a first set value as the determination threshold value in the normal mode, and uses a third set value, which is larger than the first set value, as the determination threshold value in the high power mode. As a result, the processing amount of the garbage collection (or the eviction) increases in the high power mode.

Hereinafter, the fifth embodiment will be described. Here, as an example, in the power consumption amount plan, as in the third embodiment, it is assumed that the upper limit value of the amount of power consumption is defined as a function of time.

Figure 19:
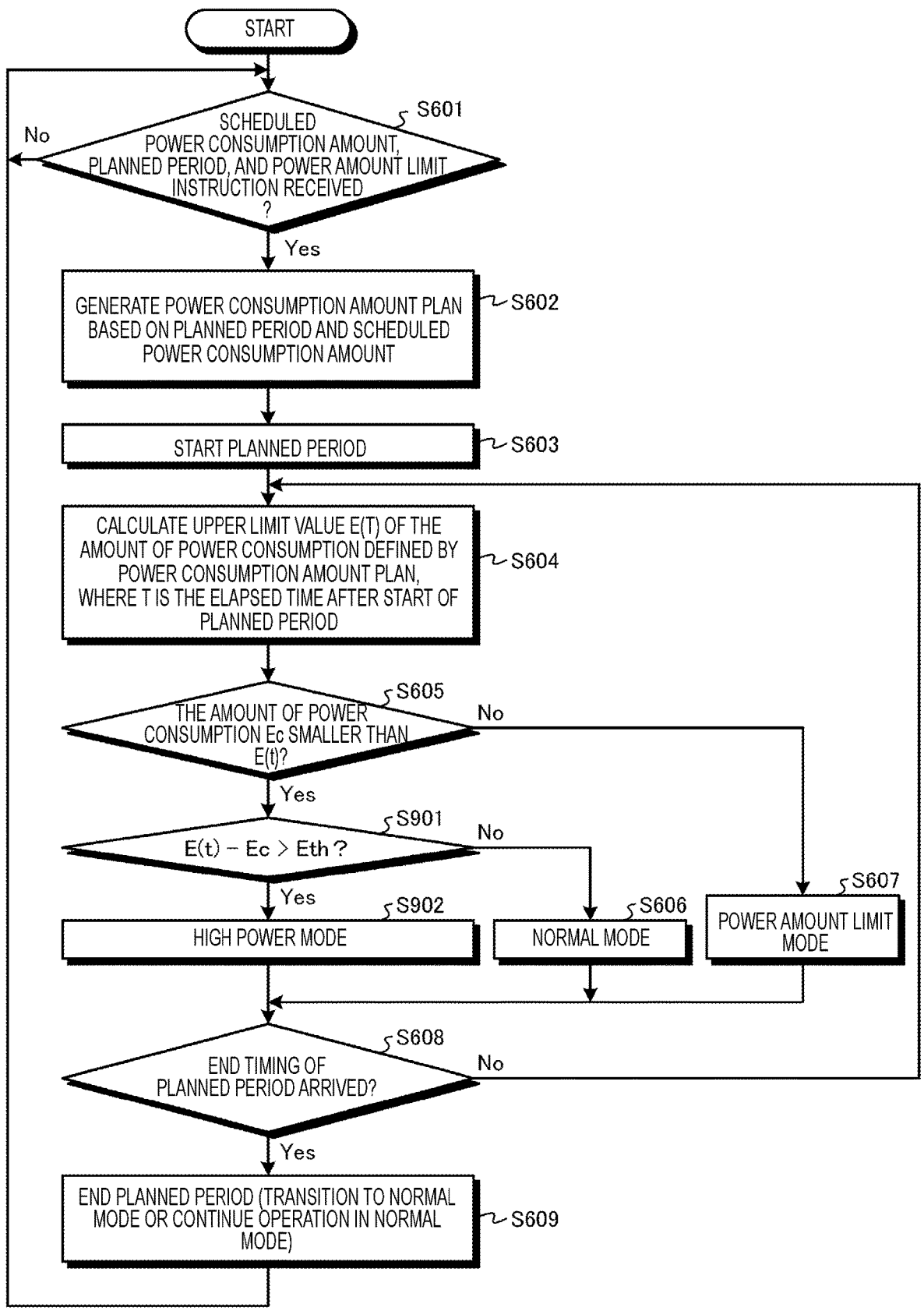
FIG. 19 is a flowchart illustrating an example of an operation related to the transition of an operation mode of a fifth embodiment.

FIG. 19 is a flowchart illustrating an example of an operation related to the transition of the operation mode of the fifth embodiment. An operation related to the amount of power of the fifth embodiment is different from the operation related to the amount of power of the third embodiment illustrated in FIG. 13 in that S901 and S902 are added after the process of S605. Hereinafter, points different from the operation related to the amount of power of the third embodiment will be described.

In the determination process of S605, when it is determined that Ec is smaller than E(t) (Yes in S605), the controller 100 determines whether or not a difference between the upper limit value E(t) of the amount of power defined by the power consumption amount plan and the actual amount of power consumption Ec, that is, (E(t)−Ec), is larger than a threshold value Eth related to the amount of power (S901). Eth is a preset positive real number.

When it is determined that (E(t)−Ec) is larger than Eth (Yes in S901), the controller 100 operates in the high power mode (S902). When it is determined that (E(t)−Ec) is not larger than Eth (No in S901), the controller 100 operates in the normal mode (S606).

After S902, S606 or S607, the controller 100 executes the determination process of S608.

In the above, it has been described that the controller 100 operates in the normal mode when (E(t)−Ec) is equal to Eth. The process when (E(t)−Ec) is equal to Eth is not limited thereto. When (E(t)−Ec) is equal to Eth, the controller 100 may operate in the high power mode.

Further, also in the fifth embodiment, the host device 2 may not collectively transmit the scheduled power consumption amount, the planned period, and the power amount limit instruction. The memory system 1 may be configured to be able to receive the scheduled power consumption amount, the planned period, or both at a timing different from the timing for the power amount limit instruction.

In this way, according to the fifth embodiment, the controller 100 is configured to be able to switch the operation mode between the normal mode, the power amount limit mode, and the high power mode in which the processing amount of the transcription process is larger than that of the normal mode. The controller 100 executes the switching of the operation mode based on the power consumption amount plan.

When the abundant amount of power may be used, the number of free blocks may be increased by increasing the processing amount of the transcription process. As the number of free blocks increases, it becomes possible to continue the operation in the power amount limit mode for a long time.

In the above, it is assumed that the upper limit value of the amount of power consumption is defined as the function of time in the power consumption amount plan. The fifth embodiment is also applicable when the upper limit value of the power consumption in the power consumption amount plan is defined as a function of host access amount (host write amount, host read amount, or both), as in the fourth embodiment.

Sixth Embodiment

In general, a storage mode with a smaller number of bits of a value stored in one memory cell transistor MT (that is, the number of levels described above) enables write and read in a shorter time and consumes less power consumption for write and read than a storage mode with a larger number of levels.

However, the storage mode with the smaller number of levels consumes more free blocks than the storage mode with the larger number of levels. When the free blocks are exhausted by continuing the write in the storage mode with the smaller number of levels, it is necessary to execute the eviction. When the eviction is executed, the power consumption increases according to the processing amount of the eviction.

Therefore, performing the write in the storage mode with the smaller number of levels when the number of free blocks is sufficient, it is possible to further reduce the amount of power consumption, although temporary, even in a state where the processing amount of the transcription process including the eviction is reduced.

According to the sixth embodiment, as an example, the memory system 1 may switch the storage mode at the time of write between the SLC mode and the TLC mode. Then, the controller 100 executes data write in the SLC mode when the number of free blocks is sufficient in the power amount limit mode. When the number of free blocks is not sufficient in the power amount limit mode, the controller 100 executes data write in the TLC mode.

The sixth embodiment may be used in combination with any of the third embodiment, the fourth embodiment, and the fifth embodiment. Here, as an example, a case used in combination with the third embodiment will be described.

Figure 20:
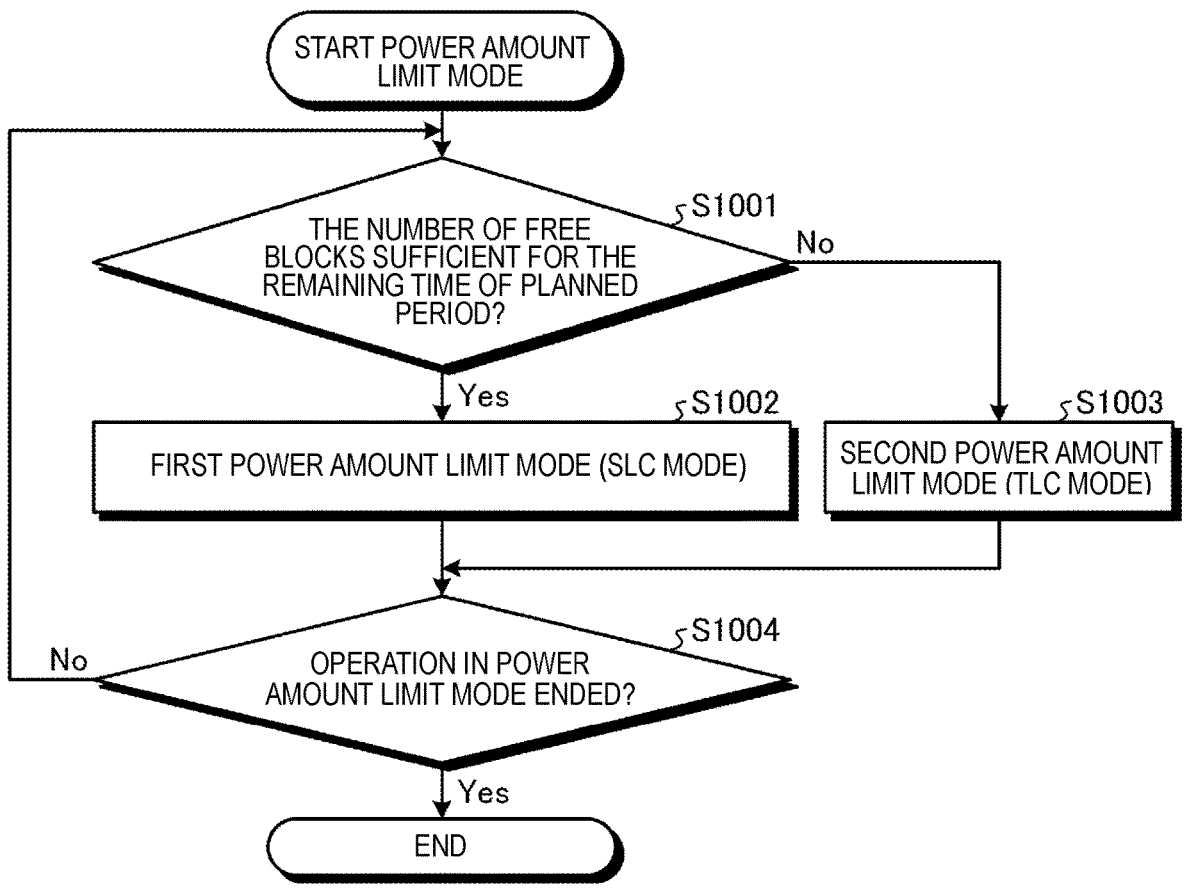
FIG. 20 is a flowchart illustrating an example of an operation in a power amount limit mode of a memory system according to a sixth embodiment.

FIG. 20 is a flowchart illustrating an example of an operation in the power amount limit mode of the memory system 1 according to the sixth embodiment.

In the power amount limit mode, the controller 100 determines whether or not the number of free blocks is sufficient for the remaining time of the planned period (S1001).

A specific method for determination of S1001 is not limited to a specific method. In one example, when the number of free blocks is larger than a threshold value determined based on the remaining time of the planned period, the controller 100 determines that the number of free blocks is sufficient for the remaining time of the planned period. When the number of free blocks is smaller than the threshold value determined based on the remaining time of the planned period, the controller 100 determines that the number of free blocks is not sufficient for the remaining time of the planned period. When the number of free blocks is equal to the threshold value determined based on the remaining time of the planned period, the controller 100 may determine that the number of free blocks is sufficient for the remaining time of the planned period or may determine that the number of free blocks is not sufficient for the remaining time of the planned period.

The threshold value determined based on the remaining time of the planned period is, for example, a threshold value proportional to the remaining time of the planned period. A method of calculating the threshold value determined based on the remaining time of the planned period is not limited thereto. The threshold value determined based on the remaining time of the planned period is an example of a third value.

When it is determined that the number of free blocks is sufficient for the remaining time of the planned period (Yes in S1001), the controller 100 sets the operation mode of the memory system 1 as a first power amount limit mode (S1002). In the first power amount limit mode, when writing data in the NAND memory 200, the controller 100 performs data write in the SLC mode in addition to the operation in the power amount limit mode described in the first embodiment or the second embodiment.

When it is determined that the number of free blocks is not sufficient for the remaining time of the planned period (No in S1001), the controller 100 sets the operation mode of the memory system 1 as a second power amount limit mode (S1003). In the second power amount limit mode, when writing data in the NAND memory 200, the controller 100 performs data write in the TLC mode in addition to the operation in the power amount limit mode described in the first embodiment or the second embodiment.

After S1002 or S1003, the controller 100 determines whether or not to end the operation in the power amount limit mode (S1004). That is, the controller 100 determines whether or not to transition the operation mode of the memory system 1 from the power amount limit mode to another mode (e.g., the normal mode). Since the condition for transition of the operation mode is the same as the condition described in the third embodiment, explanation thereof will be omitted here.

When it is determined that the operation in the power amount limit mode is not to be ended (No in S1004), the controller 100 executes the process of S1001 again. When it is determined that the operation in the power amount limit mode is to be ended (Yes in S1004), the controller 100 ends the operation in the power amount limit mode.

In this way, in the sixth embodiment, the controller 100 may reduce the number of levels, that is, the number of bits of data stored in one memory cell transistor MT, while the power amount limit mode is set according to the power consumption amount plan, so that the amount of power consumption of the memory system 1 may be reduced.

Accordingly, it is possible to further reduce the amount of power consumption as compared with the case where the number of levels is not reduced.

Further, in the sixth embodiment, when the number of free blocks is smaller than the third value (the threshold value determined based on the remaining time in the above example), the controller 100 writes data in a mode in which data having the number of first bits per one memory cell transistor is written (the TLC mode in the above example). When the number of free blocks is larger than the third value (the threshold value determined based on the remaining time in the above example), the controller 100 writes data in a mode in which data having the number of second bits less than the number of first bits per one memory cell transistor is written (the SLC mode in the above example).

Accordingly, it is possible to further reduce the amount of power consumption as compared with the case where the number of levels is not reduced.

As described above, the sixth embodiment may be used in combination with the fourth embodiment instead of the third embodiment. When the sixth embodiment is used in combination with the fourth embodiment, in S1001, the controller 100 determines whether or not the number of free blocks is sufficient for the remaining host write amount, that is, an amount obtained by subtracting the host access amount after the start of the planned period from the scheduled host access amount. The scheduled host access amount is the scheduled host write amount, the scheduled host read amount, or both received as the second value from the host device 2 and is an amount used to generate the power consumption amount plan. When the number of free blocks is sufficient for the remaining host access amount, the controller 100 executes the process of S1002. When the number of free blocks is not sufficient for the remaining host access amount, the controller 100 executes the process of S1003.

A method of determining whether or not the number of free blocks is sufficient for the remaining host access amount is not limited to a specific method. For example, when the number of free blocks is smaller than a threshold value obtained by converting the remaining host access amount into the number of block BLKs, the controller 100 determines that the number of free blocks is not sufficient for the remaining host access amount. When the number of free blocks is larger than the threshold value obtained by converting the remaining host access amount into the number of block BLKs, the controller 100 determines that the number of free blocks is sufficient for the remaining host access amount. When the number of free blocks is equal to the threshold value obtained by converting the remaining host access amount into the number of block BLKs, the controller 100 may determine that the number of free blocks is sufficient for the remaining host access amount, or may determine that the number of free blocks is not sufficient for the remaining host access amount.

The threshold value obtained by converting the remaining host access amount into the number of block BLKs is another example of the third value. The third value is not limited thereto.

The sixth embodiment may be used in combination with the fifth embodiment. That is, the controller 100 may operate in the high power mode according to the power consumption amount plan.

In the sixth embodiment, the storage mode used for data write in the normal mode (and the high power mode) is freely chosen. Since abundant power is available in the normal mode (and the high power mode), the controller 100 may perform the data write in the TLC mode.

Seventh Embodiment

When requesting the memory system 1 to write user data, the host device 2 may transmit attribute information of write target user data. This attribute information will be referred to as a data color. In a seventh embodiment, the host device 2 may instruct the memory system 1 by the data color whether the write target user data is hot or cold. Hereinafter, the write target user data to be transmitted by the host device 2 to the memory system 1 will be referred to as write data.

When data is written in the SLC mode, the eviction will be required for that data later. However, when the data written in the SLC mode is invalidated before the execution of the eviction, the execution of the eviction related to the data becomes unnecessary, so that the amount of power required for the eviction is reduced.

In the seventh embodiment, the controller 100 writes the write data indicated to be hot by the data color in the memory chip 201 by the SLC mode in the power amount limit mode. As a result, the amount of power required for write may be reduced as compared with a case where the write data is written in the memory chip 201 by the TLC mode. Then, when the write data written in the SLC mode and indicated to be hot by the data color becomes invalid before the execution of the eviction, and the eviction of the write data becomes unnecessary, the amount of power required for the eviction is reduced, and as a result, the amount of power required may be further reduced.

The seventh embodiment may be used in combination with any of the third to fifth embodiments.

Figure 21:
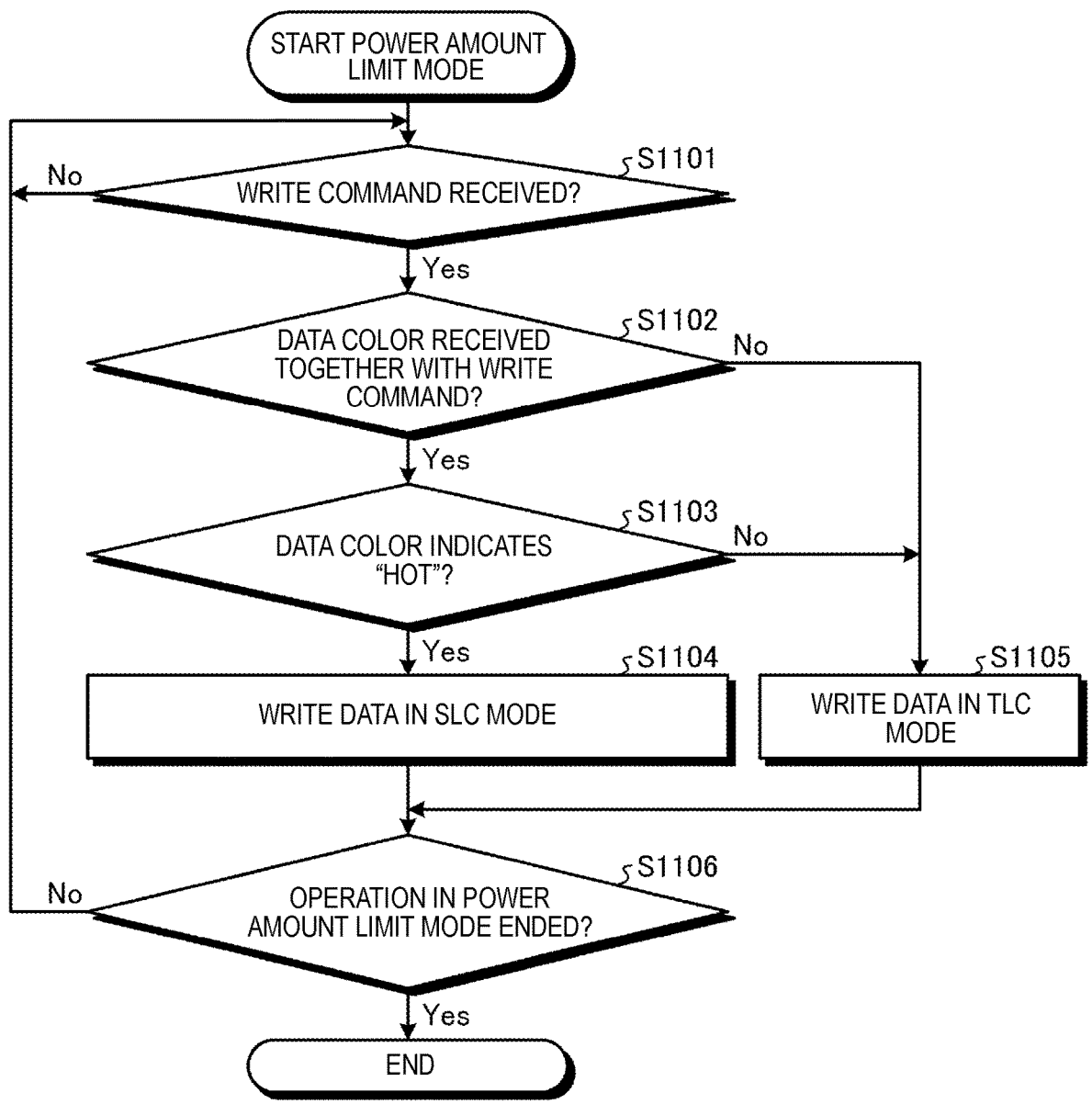
FIG. 21 is a flowchart illustrating an example of an operation in a power amount limit mode of a memory system according to a seventh embodiment.

FIG. 21 is a flowchart illustrating an example of an operation in the power amount limit mode of the memory system 1 according to the seventh embodiment. In the power amount limit mode of the seventh embodiment, the controller 100 executes a series of operations described with reference to FIG. 21 in addition to the operation of the power amount limit mode in the third to fifth embodiments.

In the power amount limit mode, the controller 100 determines whether or not the memory system 1 has received a write command from the host device 2 (S1101). When it is determined that the memory system 1 has not received the write command from the host device 2 (No in S1101), the controller 100 executes the process of S1101 again.

When it is determined that the memory system 1 has received the write command from the host device 2 (Yes in S1101), the controller 100 determines whether or not the memory system 1 has received a data color from the host device 2 together with the write command (S1102).

When it is determined that the memory system 1 has received the data color from the host device 2 (Yes in S1102), the controller 100 determines whether or not the data color indicates "hot" (S1103). When it is determined that the data color indicates "hot" (Yes in S1103), the controller 100 writes data, which is requested to be written by the received write command, in the memory chip 201 in the SLC mode (S1104).

When it is determined that the memory system 1 has not received the data color together with the write command (No in S1102), or when it is determined that the memory system 1 has received the data color, which does not indicate "hot," together with the write command (No in S1103), the controller 100 writes the data, which is requested to be written by the received write command, in the memory chip 201 in the TLC mode (S1105).

After S1104 or S1105, the controller 100 determines whether or not to end the operation in the power amount limit mode (S1106). That is, the controller 100 determines whether or not to transition the operation mode of the memory system 1 from the power amount limit mode to another mode (e.g., the normal mode). Since the condition for transition of the operation mode is as described in the other embodiments, explanation thereof will be omitted here.

When it is determined that the operation in the power amount limit mode is not to be ended (No in S1106), the controller 100 executes the process of S1101 again. When it is determined that the operation in the power amount limit mode is to be ended (Yes in S1106), the controller 100 ends the operation in the power amount limit mode.

In this way, according to the seventh embodiment, the controller 100 writes the write data in the NAND memory 200 in the storage mode corresponding to the data color instructed by the host device 2 in the power amount limit mode.

Accordingly, for example, when the host device 2 transmits data that may be rewritten in a short time to the memory system 1, and when the memory system 1 is notified that the data is hot, there is a high possibility that the processing amount of the eviction in the memory system 1 may be reduced, which may result in a high possibility that the amount of power consumption may be further reduced.

Further, when transmitting data from a volatile memory to the memory system 1 in the PLP, the host device 2 may notify that the data is hot. In that case, it is possible to reduce the amount of power consumption required for data write while shortening the time required for data write.

In addition, the information processing system 10 may be able to execute hibernation. The hibernation a function of saving the entire data of a volatile memory in a nonvolatile memory (here, for example, the memory system 1) to enter a power-off state and, when it is started next, restoring the saved data, as it is, from the nonvolatile memory into the volatile memory. By the hibernation, it is possible to quickly return to a state before the power-off state.

The data saved in the memory system 1 in the hibernation will not be needed after it is started next. Accordingly, it may be considered that the data saved in the memory system 1 in the hibernation is hot. When transmitting the data to the memory system 1 in the hibernation, the host device 2 may notify that the data is hot. In that case, it is possible to reduce the amount of power consumption required for data write while shortening the time required for data write.

Eighth Embodiment

In the seventh embodiment, the controller 100 selects the storage mode based on the data color. The controller 100 may select the storage mode based on the number of free blocks as well as the data color.

An eighth embodiment may be used in combination with any of the third to fifth embodiments. Here, as an example, an operation when the eighth embodiment is used in combination with the third embodiment will be described.

Figure 22:
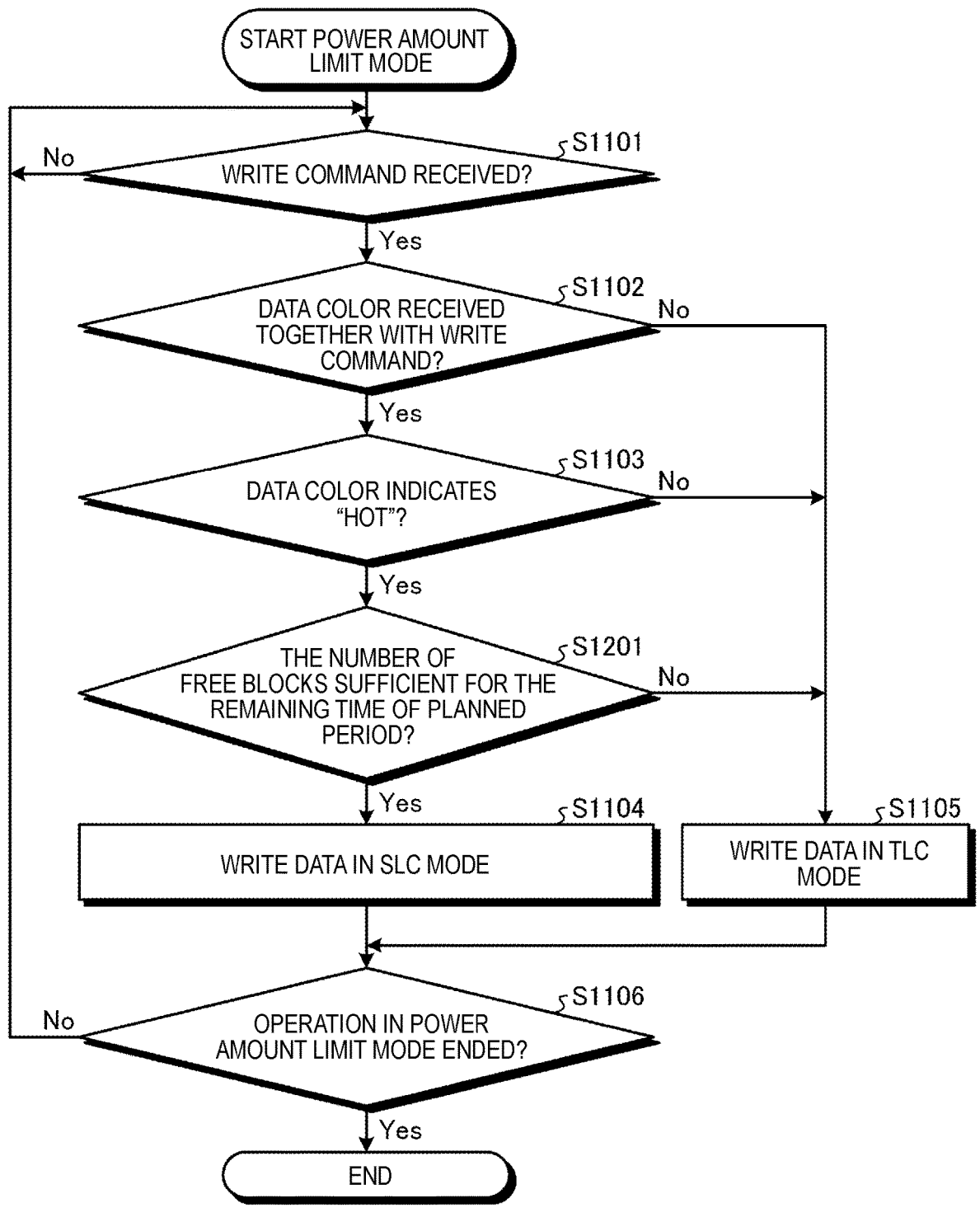
FIG. 22 is a flowchart illustrating an example of an operation in a power amount limit mode of a memory system according to an eighth embodiment.

FIG. 22 is a flowchart illustrating an example of an operation in the power amount limit mode of the memory system 1 according to the eighth embodiment.

The operation in the power amount limit mode of the memory system 1 according to the eighth embodiment is different from the operation according to the seventh embodiment illustrated in FIG. 21 in that the determination process of S1201 is added after the determination process of S1103. Hereinafter, points different from the seventh embodiment will be described.

When it is determined as Yes in the determination process of S1103, that is, when the data color received together with the write command indicates "hot", the controller 100 determines whether or not the number of free blocks is sufficient for the remaining time of the planned period (S1201).

The process of S1201 is, for example, the same as the process of S1001 described with reference to FIG. 20 in the sixth embodiment. That is, the controller 100 determines whether or not the number of free blocks is sufficient for the remaining time of the planned period based on a comparison between the number of free blocks and the third value. When the number of free blocks is smaller than the third value, the controller 100 determines that the number of free blocks is not sufficient for the remaining time of the planned period. When the number of free blocks is larger than the third value, the controller 100 determines that the number of free blocks is sufficient for the remaining time of the planned period. When the number of free blocks is equal to the third value, the controller 100 may determine that the number of free blocks is sufficient for the remaining time of the planned period, or may determine that the number of free blocks is not sufficient for the remaining time of the planned period.

When it is determined that the number of free blocks is sufficient for the remaining time of the planned period (Yes in S1201), the controller 100 writes data, which is requested to be written by the received write command, in the memory chip 201 in the SLC mode (S1104). When it is determined that the number of free blocks is not sufficient for the remaining time of the planned period (No in S1201), the controller 100 writes the data, which is requested to be written by the received write command, in the memory chip 201 in the TLC mode (S1105).

As described above, the eighth embodiment may be used in combination with the fourth embodiment instead of the third embodiment. When the eighth embodiment is used in combination with the fourth embodiment, the controller 100 determines in S1001 whether or not the number of free blocks is sufficient for the remaining host write amount, that is, an amount obtained by subtracting the host access amount after the start of the planned period from the scheduled host access amount.

The eighth embodiment may also be used in combination with the fifth embodiment. That is, the controller 100 may operate in the high power mode according to the power consumption amount plan.

In this way, according to the eighth embodiment, the controller 100 operates as follows in the power amount limit mode. That is, when the data color notified from the host device 2 is cold, which is the data color corresponding to the TLC mode, the controller 100 writes the write data in the NAND memory 200 in the TLC mode. When the data color notified from the host device 2 is hot, which is the data color corresponding to the SLC mode and the number of free blocks is smaller than the third value, the controller 100 writes the write data in the NAND memory 200 in the TLC mode. When the data color notified from the host device 2 is hot, which is the data color corresponding to the SLC mode and the number of free blocks is larger than the third value, the controller 100 writes the write data in the NAND memory 200 in the SLC mode.

Even when the controller 100 receives a notification from the host device 2 that the write data is hot, the controller 100 writes the write data in the NAND memory 200 in the TLC mode when the number of remaining free blocks is insufficient. As a result, it may be prevented that the free blocks are exhausted during the planned period, thereby preventing the execution of the eviction.

Ninth Embodiment

In some embodiments, in the operation in the power amount limited mode, the controller 100 reduces the processing amount of the transcription process or uses the storage mode with the small number of levels at the time of data write in the NAND memory 200. However, when the processing amount of the transcription process is reduced or the storage mode with the small number of levels is used in the power amount limit mode, the rate of decrease in the number of free blocks becomes faster than in the normal mode. When the free blocks are exhausted, it is difficult for the controller 100 to continue the operation in the power amount limit mode.

In a ninth embodiment, the memory system 1 may transmit status information related to whether or not the amount of power consumption may be reduced, to the host device 2. This status information will be referred to as relevant information.

The host device 2 uses the relevant information to determine the timing at which the memory system 1 is operated in the power amount limit mode, the period in which the memory system 1 is operated in the power amount limit mode, the start timing of the planned period, the planned period, and the like.

The relevant information is, for example, numerical information indicating the maximum value of the period during which the operation in the power amount limit mode is possible (or the period that may be set as the planned period). The controller 100 calculates the maximum value of the period during which the operation in the power amount limit mode is possible (or the period that may be set as the planned period) based on the number of free blocks and the like and transmits the maximum value as the relevant information to the host device 2.

In another example, the relevant information is the number of free blocks. The controller 100 transmits the number of free blocks as the relevant information to the host device 2. The host device 2 calculates the maximum value of the period during which the operation in the power amount limit mode is possible (or the period that may be set as the planned period) based on the number of free blocks received as the relevant information.

In yet another example, the relevant information may be binary information indicating whether or not the operation in the power amount limit mode (or the start of the planned period) is possible. Alternatively, the relevant information may be numerical information indicating the length of the period during which the operation in the power amount limit mode (or the start of the planned period) is prohibited. Alternatively, the relevant information may be the maximum value that may be set as the scheduled power consumption amount.

In this way, the content of the relevant information may be freely chosen.

Figure 23:
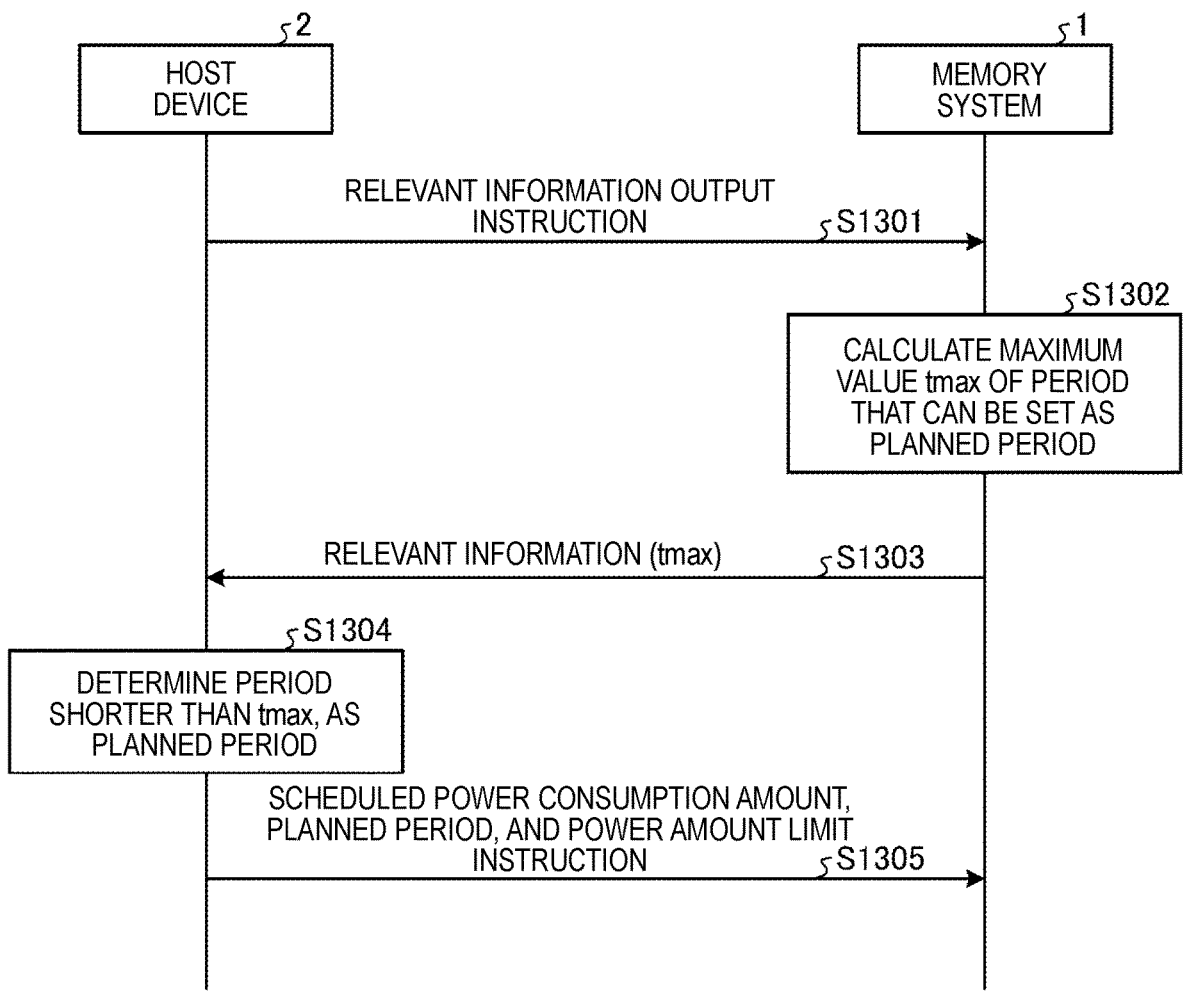
FIG. 23 is a diagram illustrating an example of a method in which a memory system of a ninth embodiment transmits operation status information to a host device.

FIG. 23 is a diagram illustrating an example of a method in which the memory system 1 of the ninth embodiment transmits the relevant information to the host device 2. In the description of FIG. 23, as an example, it is assumed that the relevant information is the numerical information indicating the maximum value of the period that may be set as the planned period.

The host device 2 first transmits a relevant information output instruction to the memory system 1 (S1301).

The relevant information output instruction may be transmitted by using any command. For example, a vendor-specific command value may be assigned as a command for transmitting the relevant information output instruction. The command for transmitting the relevant information output instruction may be incorporated in the standard of the communication interface 3. The host device 2 and the memory system 1 are connected by a dedicated signal line for transferring the relevant information output instruction, and the host device 2 may transmit the relevant information output instruction to the memory system 1 via the dedicated signal line.

In the memory system 1, the controller 100 calculates the relevant information (in this example, the maximum value tmax of the period that may be set as the planned period) according to the relevant information output instruction (S1302). For example, the controller 100 acquires the number of free blocks at the present time and calculates the maximum value of the period that may be set as the planned period, based on the acquired number of free blocks.

Then, the controller 100 transmits the maximum value obtained by the calculation, as the relevant information, to the host device 2 (S1303).

The host device 2 determines a period shorter than tmax, as the planned period (S1304) and transmits the scheduled power consumption amount, the determined planned period, and the power amount limit instruction to the memory system 1 (S1305).

As described above, the controller 100 may transmit, as the relevant information, the maximum value of the period during which the operation in the power amount limit mode is possible, the current number of free blocks, the binary information indicating whether or not the power amount limit mode may be operated, the binary information indicating whether or not the planned period may be set, the numerical information indicating the length of the period during which the operation in the power amount limit mode is prohibited, the numerical information indicating the length of the period during which the start of the planned period is prohibited, the maximum value that may be set as the scheduled power consumption amount, or a combination of all or some thereof.

The ninth embodiment may be used in combination with any of the first to eighth embodiments. The content of the relevant information may be changed in various ways depending on the embodiments used in combination with the ninth embodiment.

In this way, in the ninth embodiment, the controller 100 transmits the relevant information, which is information related to whether or not the amount of power consumption may be reduced, to the host device 2 according to the relevant information output instruction from the host device 2.

Accordingly, it is possible for the host device 2 to determine whether or not the memory system 1 may transition to the power amount limit mode, the period during which the memory system 1 may operate in the power amount limit mode, whether or not the memory system 1 may be caused to start the planned period, the period that may be set as the planned period, etc.

Modification

The controller 100 of the memory system 1 may not transmit the relevant information to the host device 2.

For example, the controller 100 of the memory system 1 may be configured so as not to execute an operation according to the power amount limit instruction even when the power amount limit instruction is received, for a predetermined period from the timing at which the power amount limit release instruction is received. Alternatively, the controller 100 of the memory system 1 may transmit to the host device 2 the effect that an operation according to the power amount limit instruction is not executed, instead of starting the operation according to the power amount limit instruction even when the power amount limit instruction is received, for a predetermined period from the timing at which the power amount limit release instruction is received.

Alternatively, the controller 100 of the memory system 1 may be configured so as not to execute the operation according to the power amount limit instruction even when the power amount limit instruction is received, for a predetermined period from the end timing of the planned period. The controller 100 of the memory system 1 may transmit to the host device 2 the effect that an operation according to the power amount limit instruction is not executed, instead of starting the operation according to the power amount limit instruction even when the power amount limit instruction is received, for a predetermined period from the end timing of the planned period.

Tenth Embodiment

The host device 2 may transmit various types of instructions (the power amount limit instruction, the power amount limit release instruction, the relevant information output instruction, etc.) or various types of information (the scheduled power consumption amount, the planned period, the scheduled host access amount, etc.) to the memory system 1 of the first to ninth embodiments based on any determination.

For example, when the information processing system 10 is a portable computer, the host device 2 may transmit the power amount limit instruction based on whether or not the information processing system 10 receives power from a power supply.

Alternatively, the host device 2 learns how to use the information processing system 10 by an operator during a predetermined period (e.g., one day or one week). Learned information regarding how the information processing system 10 is used by the operator includes, specifically, a change in workload, a timing of connecting/disconnecting the information processing system 10 to/from a power supply, a history of temporal change of battery capacity, and the like. The host device 2 predicts the future situation regarding the power of the information processing system 10 based on the information obtained by the learning. Then, the host device 2 transmits the various types of instructions or various types of information to the memory system 1 based on the prediction.

In one example, even when the power is disconnected from the power supply, when the workload is light and the host device 2 predicts that the power from the power supply will be resumed soon, the host device 2 maintains the operation of the memory system 1 in the normal mode without executing the transmission of the power amount limit instruction.

In another example, even when the information processing system 10 receives the power from the power supply, when the host device predicts that the power from the power source is disconnected immediately, the host device 2 reduces the amount of power consumption of the memory system 1 by transmitting the power amount limit instruction to the memory system 1, and allocates the reduced amount of power to charge the battery.

In this way, the host device 2 may control the amount of power consumption of the memory system 1 based on any determination.

According to the first to tenth embodiments, the memory system 1 includes the NAND memory 200 which is a nonvolatile memory, and the controller 100 that controls the NAND memory 200. The controller 100 reduces the amount of power consumption of the memory system 1 according to the power amount limit instruction from the host device 2.

Accordingly, it is possible for the host device 2 to control the amount of power consumption.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory; and
a controller configured to:
control the nonvolatile memory to reduce an amount of power consumption of the memory system based on a first instruction received from a host device connected to the memory system;
execute a first process and a second process; and
reduce a processing amount of the second process based on the first instruction;
wherein the first process includes transferring data between the host device and the nonvolatile memory, and the second process includes transcribing data in the nonvolatile memory;
wherein the controller is further configured to:
receive a first value relating to a power consumption and a second value relating to a time period from the host device;
manage an accumulated amount of the power consumption of the memory system consumed since a first timing; and
control the power consumption of the memory system so that the accumulated amount of the power consumption from the first timing to a second timing does not exceed an amount corresponding to the first value, wherein a length from the first timing to the second timing corresponds to the second value,
wherein the nonvolatile memory includes a plurality of memory cell transistors, and
the controller is configured to reduce the amount of the power consumption by reducing the number of bits of data to be written in one of the memory cell transistors configured as a write destination,
wherein the plurality of memory cell transistors are divided into a plurality of blocks, each of the plurality of blocks being a unit of a data erase operation, and
the controller is configured to write data with a first number of bits in the memory cell transistor of the write destination when the number of free blocks among the plurality of blocks is smaller than a third value, and write data with a second number of bits in the memory cell transistor of the write destination when the number of free blocks among the plurality of blocks is larger than the third value, the second number being smaller than the first number.

2. The memory system according to claim 1, wherein the nonvolatile memory includes a plurality of blocks, each of the plurality of blocks being a unit of a data erase operation, and
the controller is further configured to:
execute a garbage collection;
based on whether receiving the first instruction, select a block of a transcription source in the garbage collection among the plurality of blocks according to a first policy based on an amount of stored valid data, or select a block of the transcription source in the garbage collection among the plurality of blocks based on a second policy different from the first policy.

3. The memory system according to claim 2, wherein the first policy includes selecting a block having the smallest amount of stored valid data among the plurality of blocks as the block of the transcription source.

4. The memory system according to claim 2, wherein the second policy includes selecting a block of the transcription source in the garbage collection among the plurality of blocks based on a time at which a last write is performed.

5. The memory system according to claim 1, wherein the controller is further configured to generate a power amount plan that provides a change in an upper limit value of the accumulated amount of the power consumption based on the first value and the second value, and, based on the first instruction, control the amount of the power consumption based on the power amount plan.

6. The memory system according to claim 5, wherein the controller is configured to operate in a plurality of operation modes including a first operation mode and a second operation mode with a less amount of the power consumption than the first operation mode, and execute switching between the plurality of operation modes based on the power amount plan.

7. The memory system according to claim 6, wherein the plurality of operation modes further include a third operation mode including a processing amount of the second process that is larger than a processing amount of the first operation mode.

8. The memory system according to claim 6, wherein the nonvolatile memory includes a plurality of memory cell transistors, and
the controller is configured to receive a notification from the host device in the second operation mode and write data with the number of bits corresponding to the notification in one of the plurality of memory cell transistors configured as a write destination.

9. The memory system according to claim 6, wherein the nonvolatile memory includes a plurality of memory cell transistors,
the plurality of memory cell transistors are divided into a plurality of blocks, each of the plurality of blocks being a unit of a data erase operation, and
the controller is configured to:
receive a notification from the host device in the second operation mode;
write data with a first number of bits in one of the plurality of memory cell transistors configured as a write destination when the notification corresponds to the first number,
write the data with the first number of bits in the memory cell transistor of the write destination when the notification corresponds to a second number and the number of free blocks among the plurality of blocks is smaller than a third value, the second number being smaller than the first number, and
write data with the second number of bits in the memory cell transistor of the write destination when the notification corresponds to the second number and the number of free blocks is larger than the third value.

10. The memory system according to claim 1, wherein the controller is configured to receive first information related to the amount of the power consumption from the host device and acquire the accumulated amount of the power consumption based on the first information.

11. The memory system according to claim 1, wherein the controller is configured to transmit, to the host device according to a second instruction received from the host device, information related to whether or not the amount of the power consumption is reduced.

12. The memory system according to claim 1, wherein
the controller is configured to switch an operation mode of the memory system from a first mode to a second mode in response to receiving the first instruction, and
in the second mode, the controller reduces the processing amount of the second process.

13. The memory system according to claim 12, wherein a frequency of the second process in the second mode is lower than a frequency of the second process in the first mode.

14. The memory system according to claim 1, wherein the controller is further configured to:
generate a power amount plan based on the first value and the second value;
at a third timing between the first timing and the second timing, check whether the accumulated amount of the power consumption consumed since the first timing exceeds a first amount corresponding to the power amount plan at the third timing; and
in response to determining that the accumulated amount of the power consumption at the third timing exceeds the first amount, transition the memory system to a lower power consumption mode.

15. The memory system according to claim 14, wherein the controller is further configured to:
at a fourth timing after the third timing and before the second timing, check whether the accumulated amount of the power consumption consumed since the first timing exceeds a second amount corresponding to the power amount plan at the fourth timing; and
in response to determining that the accumulated amount of the power consumption at the fourth timing does not exceed the second amount, transition the memory system from the lower power consumption mode to a normal power consumption mode in which the amount of the power consumption is larger than the amount of the power consumption in the lower power consumption mode.

16. The memory system according to claim 14, wherein the controller is configured to generate the power amount plan by dividing the first value by the second value.

17. A memory system comprising:
a nonvolatile memory; and
a controller configured to:
control the nonvolatile memory to reduce an amount of power consumption of the memory system based on a first instruction received from a host device connected to the memory system;
execute a first process and a second process;
reduce a processing amount of the second process based on the first instruction; and
to operate in a plurality of operation modes including a first operation mode, a second operation mode, and a third operation mode;
wherein the first process includes transferring data between the host device and the nonvolatile memory, and the second process includes transcribing data in the nonvolatile memory;
wherein the second operation mode includes a less amount of power consumption than the first operation mode, the third operation mode includes a processing amount of the second process that is larger than a processing amount of the first operation mode;

wherein the nonvolatile memory has a plurality of memory cell transistors, each of the plurality of memory cell transistors includes a variable number of bits of stored data, and the controller is further configured to receive a notification from the host device in the second operation mode and write data with a number of bits corresponding to the notification in a memory cell transistor of a write destination.

18. A memory system comprising:

a nonvolatile memory; and a controller configured to:
   control the nonvolatile memory to reduce an amount of power consumption of the memory system based on a first instruction received from a host device connected to the memory system;
   execute a first process and a second process;
   reduce a processing amount of the second process based on the first instruction; and
   to operate in a plurality of operation modes including a first operation mode, a second operation mode, and a third operation mode;

wherein the first process includes transferring data between the host device and the nonvolatile memory, and the second process includes transcribing data in the nonvolatile memory wherein the second operation mode includes a less amount of power consumption than the first operation mode, the third operation mode includes a processing amount of the second process that is larger than a processing amount of the first operation mode;

wherein the nonvolatile memory includes a plurality of memory cell transistors, each of the plurality of memory cell transistors includes a variable number of bits of stored data, the plurality of memory cell transistors are divided into a plurality of blocks having stored data to be erased at one time, and the controller is configured to:
   receive a notification from the host device in the second operation mode,
   write data with a number of first bits in a memory cell transistor of a write destination when the notification corresponds to the number of first bits,
   write the data with the number of first bits in the memory cell transistor of the write destination when the notification corresponds to the number of second bits smaller than the number of first bits and a number of free blocks among the plurality of blocks is smaller than a third value, and
   write data with a number of second bits in the memory cell transistor of the write destination when the notification corresponds to the number of second bits and the number of free blocks is larger than the third value.

* * * * *